(12) United States Patent
Martin et al.

(10) Patent No.: US 11,117,193 B2
(45) Date of Patent: Sep. 14, 2021

(54) ADDITIVE MANUFACTURING WITH NANOFUNCTIONALIZED PRECURSORS

(71) Applicant: HRL Laboratories, LLC, Malibu, CA (US)

(72) Inventors: John H. Martin, Los Angeles, CA (US); Brennan Yahata, Los Angeles, CA (US); Tobias A. Schaedler, Oak Park, CA (US); Jacob M. Hundley, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 295 days.

(21) Appl. No.: 15/880,488

(22) Filed: Jan. 25, 2018

(65) Prior Publication Data
US 2018/0214949 A1  Aug. 2, 2018

Related U.S. Application Data

(60) Provisional application No. 62/452,989, filed on Feb. 1, 2017, provisional application No. 62/463,991, filed
(Continued)

(51) Int. Cl.
*B22F 10/20* (2021.01)
*B22F 5/12* (2006.01)
(Continued)

(52) U.S. Cl.
CPC ............ *B22F 10/20* (2021.01); *B22F 1/0018* (2013.01); *B22F 5/12* (2013.01); *B22F 2007/042* (2013.01);
(Continued)

(58) Field of Classification Search
CPC ........ B22F 3/1055; B22F 1/0018; B22F 5/12; B22F 2007/042; B22F 2301/052;
(Continued)

(56) References Cited

U.S. PATENT DOCUMENTS

| 5,305,726 A | 4/1994 | Scharman et al. |
| 5,340,012 A | 8/1994 | Beeferman et al. |

(Continued)

FOREIGN PATENT DOCUMENTS

| JP | 2011054892 A | 3/2011 |
| KR | 1020080105250 A | 12/2008 |
| WO | 2005017220 A1 | 2/2005 |

OTHER PUBLICATIONS

GE Additive ("What is Additive Manufacturing?". Mar. 2018). Archived from WayBack Machine in Mar. 2018. (Year: 2018).*
(Continued)

*Primary Examiner* — Anthony J Zimmer
*Assistant Examiner* — Ricardo D Morales
(74) *Attorney, Agent, or Firm* — O'Connor & Company

(57) ABSTRACT

Some variations provide a process for additive manufacturing of a nanofunctionalized metal alloy, comprising: providing a nanofunctionalized metal precursor containing metals and grain-refining nanoparticles; exposing a first amount of the nanofunctionalized metal precursor to an energy source for melting the precursor, thereby generating a first melt layer; solidifying the first melt layer, thereby generating a first solid layer; and repeating many times to generate a plurality of solid layers in an additive-manufacturing build direction. The additively manufactured, nanofunctionalized metal alloy has a microstructure with equiaxed grains. Other variations provide an additively manufactured, nanofunctionalized metal alloy comprising metals selected from aluminum, iron, nickel, copper, titanium, magnesium, zinc, silicon, lithium, silver, chromium, manganese, vanadium, bismuth, gallium, or lead; and grain-refining nanoparticles selected from zirconium, tantalum, niobium, titanium, or oxides, nitrides, hydrides, carbides, or borides thereof,
(Continued)

wherein the additively manufactured, nanofunctionalized metal alloy has a microstructure with equiaxed grains.

44 Claims, 10 Drawing Sheets

Related U.S. Application Data on Feb. 27, 2017, provisional application No. 62/463,952, filed on Feb. 27, 2017.

(51) Int. Cl.
| | |
|---|---|
| *B22F 1/00* | (2006.01) |
| *B33Y 70/00* | (2020.01) |
| *B22F 7/04* | (2006.01) |
| *B33Y 10/00* | (2015.01) |
| *C22C 1/05* | (2006.01) |

(52) U.S. Cl.
CPC ... *B22F 2301/052* (2013.01); *B22F 2301/054* (2013.01); *B22F 2301/058* (2013.01); *B22F 2301/10* (2013.01); *B22F 2301/15* (2013.01); *B22F 2301/205* (2013.01); *B22F 2301/255* (2013.01); *B22F 2301/30* (2013.01); *B22F 2304/05* (2013.01); *B22F 2999/00* (2013.01); *B33Y 10/00* (2014.12); *B33Y 70/00* (2014.12); *C22C 1/05* (2013.01); *Y02P 10/25* (2015.11)

(58) Field of Classification Search
CPC .......... B22F 2301/054; B22F 2301/058; B22F 2301/10; B22F 2301/15; B22F 2301/205; B22F 2301/255; B22F 2301/30; B22F 2999/00; B33Y 10/00; B33Y 70/00; Y02P 10/295; C22C 1/05
See application file for complete search history.

(56) References Cited

U.S. PATENT DOCUMENTS

| | | | |
|---|---|---|---|
| 5,462,712 | A | 10/1995 | Langan et al. |
| 6,024,915 | A | 2/2000 | Kume et al. |
| 6,071,628 | A | 6/2000 | Seals et al. |
| 6,254,757 | B1 | 7/2001 | Lashmore et al. |
| 6,368,427 | B1 | 4/2002 | Sigworth |
| 9,238,877 | B2 | 1/2016 | Krause et al. |
| 2002/0136884 | A1 | 9/2002 | Oechsner |
| 2003/0077473 | A1 | 4/2003 | Bretschneider et al. |
| 2003/0104147 | A1 | 6/2003 | Bretschneider et al. |
| 2005/0238528 | A1 | 10/2005 | Lin et al. |
| 2006/0065330 | A1 | 3/2006 | Cooper et al. |
| 2010/0288243 | A1 | 11/2010 | Kaburagi et al. |
| 2012/0135142 | A1 | 5/2012 | Yang et al. |
| 2012/0315399 | A1 | 12/2012 | Feng et al. |
| 2013/0012643 | A1 | 1/2013 | Monsheimer et al. |
| 2013/0146041 | A1 | 6/2013 | Hijii et al. |
| 2013/0152739 | A1 | 6/2013 | Li et al. |
| 2015/0252451 | A1 | 9/2015 | Al-Aqeeli et al. |
| 2015/0337423 | A1* | 11/2015 | Martin ............... B22F 1/0011 75/230 |
| 2017/0016095 | A1 | 1/2017 | Karlen et al. |
| 2017/0252851 | A1* | 9/2017 | Fulop ................. B29C 48/02 |

OTHER PUBLICATIONS

GE Additive ("What is Additive Manufacturing?". Mar. 2018). (Year: 2018).*

Thijs et al. ("Fine-structured aluminium products with controllable texture by selective laser melting of pre-alloyed AlSi10Mg powder." Acta Materialia 61.5 (2013): 1809-1819.) (Year: 2013).*

Wei et al. ("Evolution of solidification texture during additive manufacturing." Scientific reports 5 (2015): 16446.) (Year: 2015).*

Bocanegra-Bernal ("Hot isostatic pressing (HIP) technology and its applications to metals and ceramics." Journal of Materials Science 39.21 (2004): 6399-6420.). (Year: 2004).*

Chen et al., "Rapid control of phase growth by nanoparticles," Nature Communications 5:3879 DOI: 10.1038/ncomms4879.

Sheppard et al., "The Mechanochemical synthesis of magnesium hydride nanoparticles" Journal of Alloys and Compounds 492 (2010) L72-L74.

Zhu et al., "Growth Mechanism for the Controlled Synthesis of MgH2/Mg Crystals via a Vapor-Solid Process" Cryst. Growth Des. 2011, 11, 4166-4174.

Högberg et al., "Reactive sputtering of δ-ZrH2 thin films by high power impulse magnetron sputtering and direct current magnetron sputtering," Journal of Vacuum Science & Technology A 2014, 32, 041510.

Gharatloo et al., "Ultrasound-assisted synthesis of nano-structured zirconium hydride at room temperature," International Journal of Hydrogen Energy 40 (2015) 13942-13948.

Mukherjee et al., "Printability of alloys for additive manufacturing" Scientific Reports | 6:19717 | DOI: 10.1038/srep19717, Jan. 22, 2016.

He et al., "Alloying element vaporization during laser spot welding of stainless steel" J. Phys. D: Appl. Phys. 36 (2003) 3079-3088.

Bartkowiak et al., "New Developments of Laser Processing Aluminium Alloys via Additive Manufacturing Technique" Physics Procedia 12 (2011) 393-401.

Zhang et al., "Grain Refinement and Mechanical Properties of Cu—Cr—Zr Alloys with Different Nano-Sized TiCp Addition" Materials 2017, 10, 919; doi:10.3390/ma10080919.

Roberts et al., "A novel processing approach for additive manufacturing of commercial aluminum alloys" Physics Procedia 83 ( 2016 ) 909-917.

Martin et al., "3D printing of high-strength aluminium alloys" Nature, vol. 549, Sep. 21, 2017.

O'Masta et al., "Island formation and the heterogeneous nucleation of aluminum", Computational Materials Science 192 (available online Feb. 13, 2021) 110317.

* cited by examiner

Cracks

Residual porosity

ADDITIVE MANUFACTURING WITH NANOFUNCTIONALIZED PRECURSORS

PRIORITY DATA

This patent application is a non-provisional application with priority to U.S. Provisional Patent Application No. 62/452,989, filed on Feb. 1, 2017, U.S. Provisional Patent Application No. 62/463,991, filed on Feb. 27, 2017, and U.S. Provisional Patent Application No. 62/463,952, filed on Feb. 27, 2017, each of which is hereby incorporated by reference herein.

FIELD OF THE INVENTION

The present invention generally relates to processes for additive manufacturing using functionalized precursors (e.g., powders), and additively manufacturing materials produced by these processes.

BACKGROUND OF THE INVENTION

Metal-based additive manufacturing, or three-dimensional (3D) printing, has applications in many industries, including the aerospace and automotive industries. Building up metal components layer-by-layer increases design freedom and manufacturing flexibility, thereby enabling complex geometries while eliminating traditional economy-of-scale constraints. In metal-based additive manufacturing, application of a direct energy source, such as a laser or electron beam, to melt alloy powders locally results in solidification rates between 0.1 m/s and 5 m/s, an order of magnitude increase over conventional casting processes.

Additive manufacturing allows for one-step fabrication of complex parts of arbitrary design. Additive manufacturing eliminates the need for assembling multiple components or setting up new equipment, while minimizing manufacturing time and wastage of materials and energy. Although additive manufacturing is rapidly growing to produce metallic, polymeric, and ceramic components, production of metallic parts is its fastest growing sector.

In order to successfully print a metallic part, an appropriate alloy must be selected. Successive layers need to be adequately bonded by fusion. An understanding of printability, including the ability of an alloy to resist distortion, compositional changes, and fusion defects, is important for powder bed-based additive manufacturing processes.

Currently only a few alloys, the most relevant being AlSi10Mg, TiAl6V4, CoCr, and Inconel 718, can be reliably additively manufacturing. The vast majority of the more than 5,500 alloys in use today cannot be additively manufactured because the melting and solidification dynamics during the printing process lead to intolerable microstructures with large columnar grains and cracks. 3D-printable metal alloys are limited to those known to be easily weldable. The limitations of the currently printable alloys, especially with respect to specific strength, fatigue life, and fracture toughness, have hindered metal-based additive manufacturing. See Martin et al., "3D printing of high-strength aluminium alloys," Nature vol. 549, pages 365-369.

Specifically regarding aluminum alloys, for example, the only printable aluminum alloys are based on the binary Al—Si system and tend to converge around a yield strength of approximately 200 MPa with a low ductility of 4%. The exception is Scalmalloy, which relies on alloying additions of scandium, a rare high-cost metal. In contrast, most aluminum alloys used in automotive, aerospace, and consumer applications are wrought alloys of the 2000, 5000, 6000, or 7000 series, which can exhibit strengths exceeding 400 MPa and ductility of more than 10% but cannot currently be additively manufactured. These systems have low-cost alloying elements (Cu, Mg, Zn, and Si) carefully selected to produce complex strengthening phases during subsequent ageing. These same elements promote large solidification ranges, leading to hot tearing (cracking) during solidification—a problem that has been difficult to surmount for more than 100 years since the first age-hardenable alloy, duralumin, was developed.

In particular, during solidification of these alloys, the primary equilibrium phase solidifies first at a different composition from the bulk liquid. This mechanism results in solute enrichment in the liquid near the solidifying interface, locally changing the equilibrium liquidus temperature and producing an unstable, undercooled condition. As a result, there is a breakdown of the solid-liquid interface leading to cellular or dendritic grain growth with long channels of interdendritic liquid trapped between solidified regions. As temperature and liquid volume fraction decrease, volumetric solidification shrinkage and thermal contraction in these channels produces cavities and hot tearing cracks which may span the entire length of the columnar grain and can propagate through additional intergranular regions. Note that aluminum alloys Al 7075 and Al 6061 are highly susceptible to the formation of such cracks, due to a lack of processing paths to produce fine equiaxed grains.

Fine equiaxed microstructures accommodate strain in the semi-solid state by suppressing coherency that locks the orientation of these solid dendrites and promotes tearing. Producing equiaxed structures requires large amounts of undercooling, which has thus far proven difficult in additive processes where high thermal gradients arise from rastering of a direct energy source in an arbitrary geometric pattern.

Scan strategies have been developed to control microstructure, but these strategies are highly material-limited and geometry-limited. Use of nanoparticles in additive manufacturing has been described, but the nanoparticles are incorporated through ball milling, making scale-up and uniformity difficult.

What is needed is an approach to control solidification microstructure by promoting nucleation of new grains of metal alloy. What are specifically desired are additively manufactured metal alloys with equiaxed-grain microstructures that are substantially free of hot cracks.

SUMMARY OF THE INVENTION

The present invention addresses the aforementioned needs in the art, as will now be summarized and then further described in detail below.

Some variations provide a process for additive manufacturing of a nanofunctionalized metal alloy, the process comprising:

(a) providing a nanofunctionalized metal precursor containing one or more metals and grain-refining nanoparticles;

(b) exposing a first amount of the nanofunctionalized metal precursor to an energy source for melting the first amount of the nanofunctionalized metal precursor, thereby generating a first melt layer;

(c) solidifying the first melt layer, thereby generating a first solid layer of an additively manufactured, nanofunctionalized metal alloy;

(d) optionally, repeating steps (b) and (c) a plurality of times to generate a plurality of solid layers by sequentially solidifying a plurality of melt layers in an additive-manufacturing build direction, thereby producing additional solid layers in the additively manufactured, nanofunctionalized metal alloy, wherein the additively manufactured, nanofunctionalized metal alloy has a microstructure with equiaxed grains.

The one or more metals may be selected from the group consisting of aluminum, iron, nickel, copper, titanium, magnesium, zinc, silicon, lithium, silver, chromium, manganese, vanadium, bismuth, gallium, lead, and combinations thereof.

The one or more nanoparticle elements may be selected from the group consisting of (a) zirconium, tantalum, niobium, titanium, and (b) oxides, nitrides, hydrides, carbides, or borides thereof, and (c) combinations of the foregoing (i.e. species in subgroups (a) and/or (b)).

In some embodiments, the nanofunctionalized metal precursor is in the form of a powder. In other embodiments, the nanofunctionalized metal precursor is in the form of a wire.

The grain-refining nanoparticles may be present in a nanoparticle concentration of at least 0.1 vol % or at least 1 vol % within the nanofunctionalized metal precursor. The grain-refining nanoparticles have an average largest dimension from about 50 nanometers to about 5000 nanometers, in various embodiments.

The energy source in step (b) may be provided by a laser beam and/or an electron beam, for example.

In various embodiments, steps (b) and (c) utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof.

The additively manufactured, nanofunctionalized metal alloy preferably has a microstructure that is substantially crack-free. In some embodiments, the additively manufactured, nanofunctionalized metal alloy also a microstructure that is also substantially free of porous void defects.

The additively manufactured, nanofunctionalized metal alloy may be characterized by an average grain size of less than 1 millimeter, such as less than 10 microns.

The additively manufactured, nanofunctionalized metal alloy may have a microstructure with a crystallographic texture that is not solely oriented in the additive-manufacturing build direction. The plurality of solid layers may have differing primary growth-direction angles with respect to each other. The plurality of solid layers may include at least 10 (e.g., 100 or more) individual solid layers in the additively manufactured, nanofunctionalized metal alloy. The solid layers may have an average (individual) layer thickness of at least 10 microns.

The additively manufactured, nanofunctionalized metal alloy may be selected from the group consisting of an aluminum alloy, a steel alloy, a nickel alloy, a titanium alloy, a copper alloy, and combinations thereof.

Other variations provide an additively manufactured, nanofunctionalized metal alloy comprising:

(a) one or more metals such as, but not limited to, metals selected from the group consisting of aluminum, iron, nickel, copper, titanium, magnesium, zinc, silicon, lithium, silver, chromium, manganese, vanadium, bismuth, gallium, lead, and combinations thereof; and (b) grain-refining nanoparticles comprising one or more nanoparticle elements such as, but not limited to, elements selected from the group consisting of zirconium, tantalum, niobium, titanium, and oxides, nitrides, hydrides, carbides, or borides thereof, and combinations of the foregoing, wherein the additively manufactured, nanofunctionalized metal alloy has a microstructure with equiaxed grains.

In some embodiments, the grain-refining nanoparticles are present in a nanoparticle concentration of at least 0.01 vol %, at least 0.1 vol %, or at least 1 vol % on the basis of the overall additively manufactured, nanofunctionalized metal alloy. The grain-refining nanoparticles have an average largest dimension from about 50 nanometers to about 5000 nanometers, in various embodiments.

In some embodiments, the grain-refining nanoparticles are selected from the group consisting of $Al_3Zr$, $Al_3Ta$, $Al_3Nb$, $Al_3Ti$, $TiB$, $TiB_2$, $WC$, $AlB$, and combinations thereof.

In certain embodiments, the additively manufactured, nanofunctionalized metal alloy comprises inclusions that contain both (i) at least one of the selected one or more metals and (ii) at least one of the one or more nanoparticle elements.

The grain-refining nanoparticles may be lattice-matched to within ±5%, preferably to within ±2%, and more preferably to within ±0.5% compared to a metal alloy containing the one or more metals but not the grain-refining nanoparticles.

The grain-refining nanoparticles are atomic density-matched to within ±25%, preferably to within ±5%, and more preferably to within ±5% compared to a metal alloy containing the one or more metals but not the grain-refining nanoparticles.

The additively manufactured, nanofunctionalized metal alloy may be characterized by an average grain size of less than 1 millimeter, such as than 10 microns, or less than 0.1 microns.

In some embodiments, the additively manufactured, nanofunctionalized metal alloy microstructure is substantially crack-free. In addition, in certain embodiments, the additively manufactured, nanofunctionalized metal alloy microstructure is substantially free of porous void defects.

The additively manufactured, nanofunctionalized metal alloy microstructure may have a crystallographic texture that is not solely oriented in an additive-manufacturing build direction. The microstructure may contain a plurality of dendrite layers having differing primary growth-direction angles with respect to each other. In some embodiments, the plurality of dendrite layers has an average layer thickness of at least 10 microns.

The additively manufactured, nanofunctionalized metal alloy may be selected from the group consisting of an aluminum alloy, a steel alloy, a nickel alloy, a titanium alloy, a copper alloy, and combinations thereof.

Some variations provide a nanofunctionalized metal alloy comprising:

(a) one or more metals selected from the group consisting of aluminum, iron, nickel, copper, titanium, magnesium, zinc, silicon, lithium, silver, chromium, manganese, vanadium, bismuth, gallium, lead, and combinations thereof; and (b) grain-refining nanoparticles comprising a nanoparticle element selected from the group consisting of zirconium, tantalum, niobium, titanium, and oxides, nitrides, hydrides, carbides, or borides thereof, and combinations of the foregoing, wherein the grain-refining nanoparticles may have an average largest dimension from about 50 nanometers to about 5000 nanometers, wherein preferably the nanofunctionalized metal alloy has a microstructure that is substantially crack-free with equiaxed grains.

DETAILED DESCRIPTION OF EMBODIMENTS OF THE INVENTION

Figure 1A:
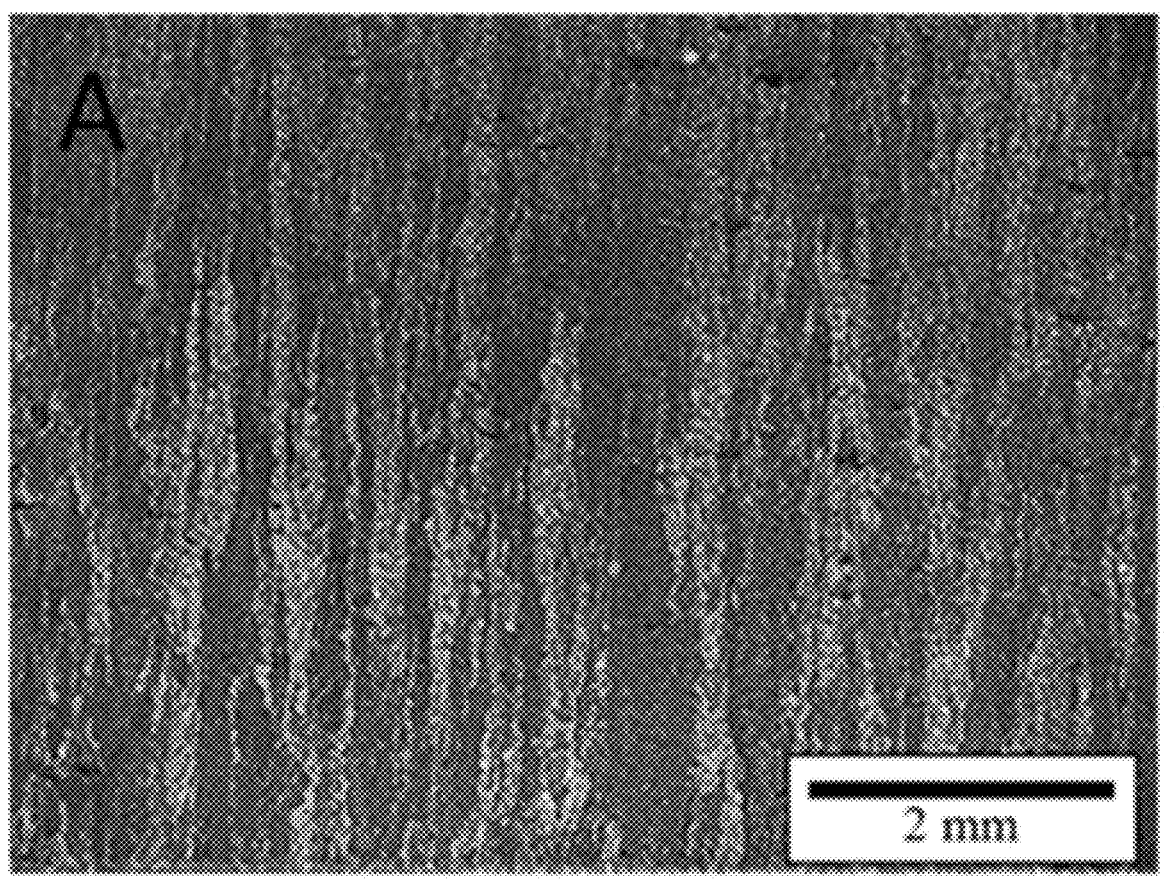
FIG. 1A shows an optical image of additively manufactured, non-grain-refined pure aluminum, revealing large columnar grains.

The compositions, structures, systems, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

This patent application describes several methodologies for the additive manufacturing of nanofunctionalized metal-containing powders or other forms of nanofunctionalized metal-containing precursors. Variations of the invention enable the additive manufacturing of metals and metal alloys heretofore not additively manufacturable, by controlling the grain structure during additive manufacturing. In preferred embodiments, crack-free and high-strength metal alloys are produced. The principles of this invention are alloy-agnostic and can be applied to any powder-based additive manufacturing process as well as additive manufacturing processes employing other precursor geometries, such as (but not limited to) wires.

Some variations provide a process for additive manufacturing of a nanofunctionalized metal alloy, the process comprising:

(a) providing a nanofunctionalized metal precursor containing one or more metals and grain-refining nanoparticles;

(b) exposing a first amount of the nanofunctionalized metal precursor to an energy source for melting the first amount of the nanofunctionalized metal precursor, thereby generating a first melt layer;

(c) solidifying the first melt layer, thereby generating a first solid layer;

(d) repeating steps (b) and (c) a plurality of times to generate a plurality of solid layers by sequentially solidifying a plurality of melt layers in an additive-manufacturing build direction, thereby producing an additively manufactured, nanofunctionalized metal alloy; and (e) recovering the additively manufactured, nanofunctionalized metal alloy.

wherein the additively manufactured, nanofunctionalized metal alloy preferably has a microstructure with equiaxed grains.

In some embodiments, the one or more metals are selected from the group consisting of aluminum, iron, nickel, copper, titanium, magnesium, zinc, silicon, lithium, silver, chromium, manganese, vanadium, bismuth, gallium, lead, and combinations thereof. In these or other embodiments, the one or more nanoparticle elements are selected from the group consisting of zirconium, tantalum, niobium, titanium, and oxides, nitrides, hydrides, carbides, or borides thereof, and combinations of the foregoing.

Generally speaking, the nanofunctionalized metal alloy may contain one or more alloying elements selected from the group consisting of Al, Si, Fe, Cu, Ni, Mn, Mg, Cr, Zn, V, Ti, Bi, Ga, Pb, or Zr. Other alloying elements may be included in the nanofunctionalized metal alloy, such as (but not limited to) H, Li, Be, B, C, N, O, F, Na, P, S, Cl, K, Ca, Sc, Co, Zn, Ga, Ge, As, Se, Br, Rb, Sr, Y, Nb, Mo, Tc, Ru, Rh, Pd, Ag, Cd, In, Sn, Te, I, Cs, Ba, Hf, Ta, W, Re, Os, Ir, Pt, Au, Hg, Tl, Ce, Nd, and combinations thereof. These other alloying elements may function as grain refiners, as strength enhancers, as stability enhancers, or a combination thereof.

As a specific example pertaining to zirconium, zirconium nanoparticles may be present as $ZrH_x$(x=0 to 4), i.e. in hydride form when x>0. An exemplary zirconium hydride is $ZrH_2$.

In general, the geometry of the nanofunctionalized metal precursor is not limited and may be, for example, in the form of powder particles, wires, rods, bars, plates, films, coils, spheres, cubes, prisms, cones, irregular shapes, or combinations thereof. In certain embodiments, the nanofunctionalized metal precursor is in the form of a powder, a wire, or a combination thereof (e.g., a wire with powder on the surface). When the nanofunctionalized metal precursor is in the form of powder, the powder particles may have an average diameter from about 1 micron to about 500 microns, such as about 10 microns to about 100 microns, for example. When the nanofunctionalized metal precursor is in the form of a wire, the wire may have an average diameter from about 10 microns to about 1000 microns, such as about 50 microns to about 500 microns, for example.

The grain-refining nanoparticles may be present in a nanoparticle concentration of at least 0.01 vol %, 0.1 vol %, 1 vol %, or 5 vol % within the nanofunctionalized metal precursor. More details about the nanofunctionalized metal precursor, the grain-refining nanoparticles, and the mechanisms involved in making the foregoing can be found below.

The energy source in step (b) may be provided by a laser beam, an electron beam, alternating current, direct current, plasma energy, induction heating from an applied magnetic field, ultrasonic energy, other sources, or a combination thereof. Typically, the energy source is a laser beam or an electron beam.

Process steps (b) and (c) may utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof, for example.

In certain embodiments, the additive manufacturing process is selected from the group consisting of selective laser melting, energy-beam melting, laser engineered net shaping, and combinations thereof.

Selective laser melting utilizes a laser (e.g., Yb-fiber laser) to provide energy for melting. Selective laser melting designed to use a high power-density laser to melt and fuse metallic powders together. The process has the ability to fully melt the metal material into a solid 3D part. A combination of direct drive motors and mirrors, rather than fixed optical lens, may be employed. An inert atmosphere is usually employed. A vacuum chamber can be fully purged between build cycles, allowing for lower oxygen concentrations and reduced gas leakage.

Electron beam melting uses a heated powder bed of metal that is then melted and formed layer by layer, in a vacuum, using an electron beam energy source similar to that of an electron microscope. Metal powder is welded together, layer by layer, under vacuum.

Laser engineering net shaping is a powder-injected technique operates by injecting metal powder into a molten pool of metal using a laser as the energy source. Laser engineered net shaping is useful for fabricating metal parts directly from a computer-aided design solid model by using a metal powder injected into a molten pool created by a focused, high-powered laser beam. Laser engineered net shaping is similar to selective laser sintering, but the metal powder is applied only where material is being added to the part at that moment. Note that "net shaping" is meant to encompass "near net" fabrication.

Direct metal laser sintering process works by melting fine powders of metal in a powder bed, layer by layer. A laser supplies the necessary energy and the system operates in a protective atmosphere, typically of nitrogen or argon.

Another approach utilizes powder injection to provide the material to be deposited. Instead of a bed of powder that is reacted with an energy beam, powder is injected through a nozzle that is then melted to deposit material. The powder may be injected through an inert carrier gas or by gravity feed. A separate shielding gas may be used to protect the molten metal pool from oxidation.

Directed energy deposition utilizes focused energy (either an electron beam or laser beam) to fuse materials by melting as the material is being deposited. Powder or wire feedstock can be utilized with this process. Powder-fed systems, such as laser metal deposition and laser engineered net shaping, blow powder through a nozzle, with the powder melted by a laser beam on the surface of the part. Laser-based wirefeed systems, such as laser metal deposition-wire, feed wire through a nozzle with the wire melted by a laser, with inert gas shielding in either an open environment (gas surrounding the laser), or in a sealed gas enclosure or chamber.

Some embodiments utilize wire feedstock and an electron beam heat source to produce a near-net shape part inside a vacuum chamber. An electron beam gun deposits metal via the wire feedstock, layer by layer, until the part reaches the desired shape. Then the part optionally undergoes finish heat treatment and machining. Wire can be preferred over powder for safety and cost reasons.

Herderick, "Additive Manufacturing of Metals: A Review," *Proceedings of Materials Science and Technology* 2011, Additive Manufacturing of Metals, Columbus, Ohio, 2011, is hereby incorporated by reference herein for its teaching of various additive manufacturing techniques.

In any of these additive manufacturing techniques, post-production processes such as heat treatment, light machining, surface finishing, coloring, stamping, or other finishing operations may be applied. Also, several additive manufactured parts may be joined together chemically or physically to produce a final object.

The additively manufactured, nanofunctionalized metal alloy, following recovery in step (e), preferably has a microstructure that is substantially crack-free. In some embodiments, the additively manufactured, nanofunctionalized metal alloy has a microstructure that is substantially free of porous void defects.

In some embodiments, the additively manufactured, nanofunctionalized metal alloy is characterized by an average grain size of less than 1 millimeter, such as less than 10 microns.

In many embodiments, the additively manufactured, nanofunctionalized metal alloy has a microstructure with a crystallographic texture that is not solely oriented in the additive-manufacturing build direction. For example, the solid layers may have differing primary growth-direction angles with respect to each other.

Figure 6:
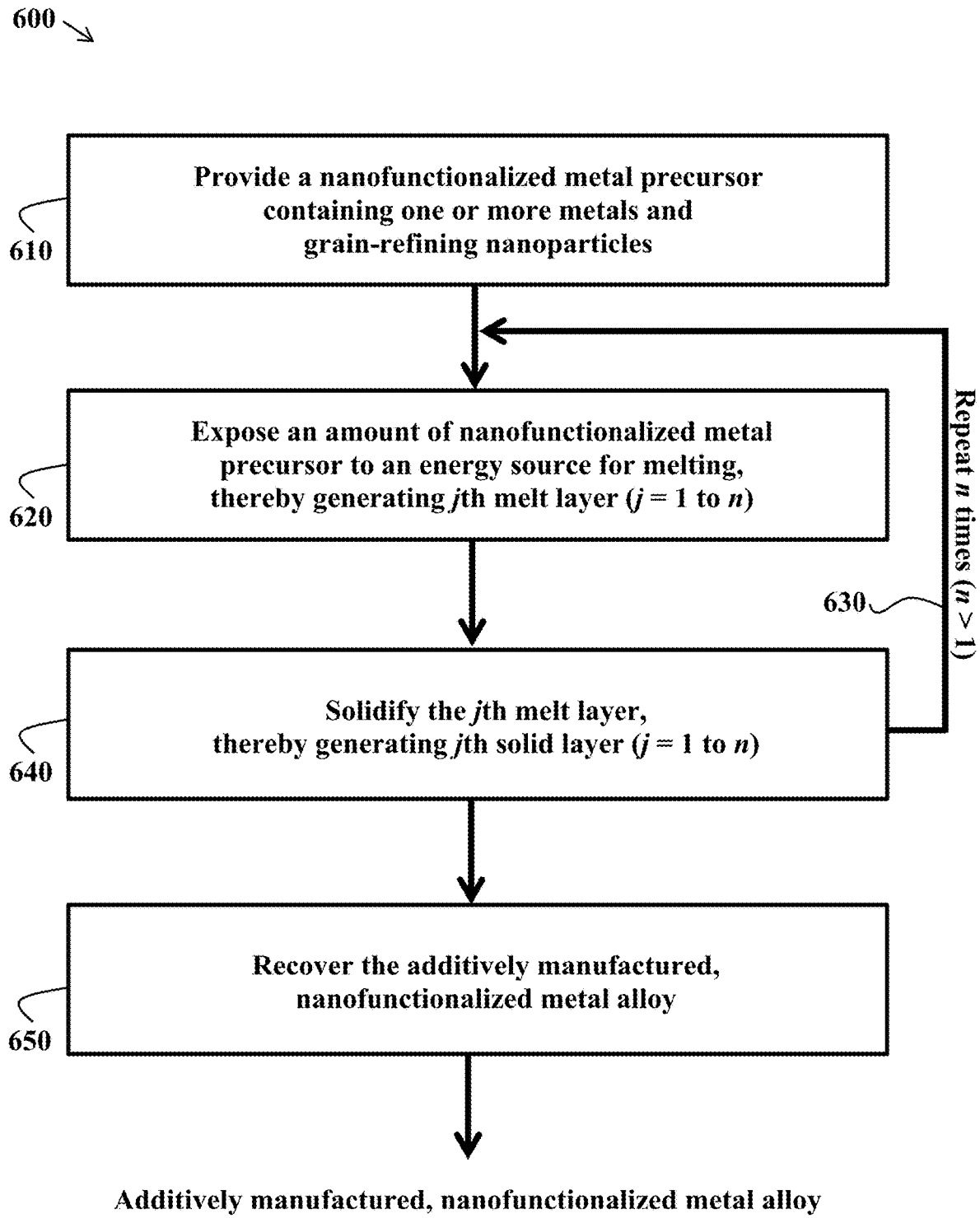
FIG. 6 is an exemplary process flowchart for producing an additively manufactured, nanofunctionalized metal alloy, in some embodiments.

FIG. 6 is a flowchart for an exemplary process 600 for producing an additively manufactured, nanofunctionalized metal alloy, in some embodiments. In step 610, a nanofunctionalized metal precursor containing one or more metals and grain-refining nanoparticles is provided. In step 620, an amount of nanofunctionalized metal precursor is exposed to an energy source for melting, thereby generating a jth melt layer (j=1 to n; n>1). In step 640, the jth melt layer is solidified, thereby generating a jth solid layer. Steps 620 and 640 each are repeated n times (repeat loop 630), where n is an integer that is at least 2, to produce n individual solid layers. Step 650 recovers the additively manufactured, nanofunctionalized metal alloy which contains n solid layers.

The process 600 is not limited in principle to the number of solid layers that may be fabricated. A "plurality of solid layers" (n in FIG. 6) means at least 2 layers, such as at least 10 individual solid layers in the additively manufactured, nanofunctionalized metal alloy. The number of solid layers may be much greater than 10, such as about 100, 1000, 10000, or more. The plurality of solid layers may be characterized by an average layer thickness of at least 10 microns, such as about 10, 20, 30, 40, 50, 75, 100, 150, or 200 microns.

The final additively manufactured, nanofunctionalized metal alloy may be selected, for example, from the group consisting of an aluminum alloy, a steel alloy, a nickel alloy, a titanium alloy, a copper alloy, and combinations thereof, without limitation.

In some embodiments, aluminum is present in a concentration from about 0.1 wt % to about 90 wt %. In some embodiments, copper is present in a concentration from about 0.1 wt % to about 90 wt %. In these or other embodiments, magnesium is present in a concentration from about 0.1 wt % to about 90 wt %. In these or other embodiments, at least one of zinc or silicon is present in a concentration from about 0.1 wt % to about 90 wt %. In some embodiments, the metal alloy further comprises chromium. In some embodiments, scandium is not present in the metal alloy.

In certain embodiments, a metal alloy consists essentially of Al 7075 alloy (or another aluminum alloy in the 7000 series) in combination with grain-refining nanoparticles. In other embodiments, a metal alloy consists essentially of Al 6061 alloy (or another aluminum alloy in the 6000 series) in combination with grain-refining nanoparticles.

The metal alloy (e.g., aluminum alloy) may have a tensile strength of at least 400 MPa. In various embodiments, the metal alloy has a tensile strength of about, or at least about, 250, 300, 350, 400, 450, or 500 MPa.

Other metal alloys may be produced, besides alloys of aluminum, steel, nickel, titanium, or copper. In other embodiments, additively manufactured, nanofunctionalized materials other than metal alloys may be produced, such as additively manufactured, nanofunctionalized polymers, additively manufactured, nanofunctionalized ceramics, additively manufactured, nanofunctionalized glass materials, or additively manufactured, nanofunctionalized carbon materials.

Some embodiments provide a metal alloy additive manufacturing process comprising:
(a) obtaining a base metal;
(b) obtaining at least one strengthening element;
(c) combining the base metal with the strengthening element(s), to generate microparticles;
(d) chemically and/or physically disposing at least one grain-refining element on surfaces of the microparticles, to generate functionalized microparticles; and
(e) additively manufacturing a metal alloy from the functionalized microparticles, wherein the resulting additively manufactured metal alloy has a microstructure with equiaxed grains.

Other variations provide an additively manufactured, nanofunctionalized metal alloy comprising:
(a) one or more metals selected from the group consisting of aluminum, iron, nickel, copper, titanium, magnesium, zinc, silicon, lithium, silver, chromium, manganese, vanadium, bismuth, gallium, lead, and combinations thereof;
(b) grain-refining nanoparticles comprising one or more nanoparticle elements selected from the group consisting of zirconium, tantalum, niobium, titanium, and combinations, oxides, nitrides, hydrides, carbides, or borides thereof,
wherein the additively manufactured, nanofunctionalized metal alloy has a microstructure with equiaxed grains.

The one or more metals typically includes a base metal (such as, but not limited to, aluminum) and one or more strengthening elements, to form a metal alloy. In various embodiments, at least one strengthening element, or a plurality of strengthening elements, is present in a concentration from about 0.01 wt % to about 20 wt %, such as about 0.1, 0.5, 1.0, 1.5, 2, 3, 4, 5, 6, 7, 8, 9, 10, 11, 12, 13, 14, or 15 wt %.

A metal alloy microstructure that has "equiaxed grains" means that at least 90 vol %, preferably at least 95 vol %, and more preferably at least 99 vol % of the metal alloy contains grains that are roughly equal in length, width, and height. In preferred embodiments, at least 99 vol % of the metal alloy contains grains that are characterized in that there is less than 25%, preferably less than 10%, and more preferably less than 5% standard deviation in each of average grain length, average grain width, and average grain height. In the metal alloy, crystals of metal alloy form grains in the solid. Each grain is a distinct crystal with its own orientation. The areas between grains are known as grain boundaries. Within each grain, the individual atoms form a crystalline lattice. In this disclosure, equiaxed grains result when there are many nucleation sites arising from grain-refining nanoparticles contained in the metal alloy microstructure.

The grain-refining nanoparticles are preferably present in a concentration of at least 0.01 vol %, such as at least 0.1 vol %, at least 1 vol %, or at least 5 vol %. In various embodiments, the grain-refining nanoparticles are present in a concentration of about, or at least about, 0.1, 0.2, 0.5, 1, 2, 3, 4, 5, 6, 7, 8, 9, or 10 vol %. The concentration of the grain refiner may be varied by adjusting the amount of grain refiner functionalized on the precursor surface, and/or by adjusting the concentration of functionalized precursors versus non-functionalized precursors in the feedstock material.

The preferred concentration of grain refiner(s) will depend on the selected alloy and grain refiner. In certain alloys, grain refinement should be minimized to avoid potential detrimental interactions; however, some alloy systems such as Al 7075 can accommodate greater concentrations. Due to the ease of producing and processing the material, routine experimentation can be performed by a person of ordinary skill in the art to inform material selection and concentration for the grain-refining nanoparticles.

Grain-refining nanoparticles, in certain embodiments, are selected from the group consisting of $Al_3Zr$, $Al_3Ta$, $Al_3Nb$, $Al_3Ti$, TiB, $TiB_2$, WC, AlB, and combinations thereof. These multicomponent nanoparticles may be in place of, or in addition to, elemental forms such as zirconium, tantalum, niobium, titanium, or oxides, nitrides, hydrides, carbides, or borides thereof.

The additively manufactured, nanofunctionalized metal alloy may comprise inclusions that contain both (i) at least one of the one or more metals and (ii) at least one of the one or more nanoparticle elements. An example of an inclusion is $Al_3Zr$ in which the aluminum atoms are derived from an aluminum-containing precursor (e.g., an aluminum alloy powder) and the zirconium atom is derived from zirconium-containing nanoparticles (e.g., Zr or $ZrH_2$ nanoparticles). During additive manufacturing, a chemical reaction may take place to form $Al_3Zr$ nanoparticle inclusions which themselves act as grain-refining nanoparticles.

In some embodiments, the grain-refining nanoparticles are lattice-matched to within ±5% compared to an otherwise-equivalent metal alloy containing the one or more metals but not the grain-refining nanoparticles. In certain embodiments, the grain-refining nanoparticles are lattice-matched to within ±2% or within ±0.5% compared to a metal alloy containing the one or more metals but not the grain-refining nanoparticles.

In some embodiments, the grain-refining nanoparticles are atomic density-matched to within ±25% compared to an otherwise-equivalent metal alloy containing the one or more metals but not the grain-refining nanoparticles. In certain embodiments, the grain-refining nanoparticles are atomic density-matched to within ±5% or within ±0.5% compared to a metal alloy containing the one or more metals but not the grain-refining nanoparticles.

The additively manufactured, nanofunctionalized metal alloy may be characterized by an average grain size of less than 1 millimeter. In some embodiments, the additively manufactured, nanofunctionalized metal alloy is characterized by an average grain size of less than 10 microns. In certain embodiments, the additively manufactured, nanofunctionalized metal alloy is characterized by an average grain size of less than 0.1 microns. In various embodiments, the metal alloy may be characterized by an average grain size of about, or less than about, 500 microns, 400 microns, 300 microns, 200 microns, 100 microns, 50 microns, 25 microns, 10 microns, 5 microns, 2 microns, 1 micron, 0.5 microns, 0.2 microns, or 0.1 microns.

Preferably, the microstructure of the additively manufactured, nanofunctionalized metal alloy is substantially crack-free. In certain embodiments, the microstructure is also substantially free of porous void defects.

A metal alloy microstructure that is "substantially crack-free" means that at least 99.9 vol % of the metal alloy contains no linear or tortuous cracks that are greater than 0.1 microns in width and greater than 10 microns in length. In other words, to be considered a crack, a defect must be a void space that is at least 0.1 microns in width as well as at least 10 microns in length. A void space that has a length shorter than 10 microns but larger than 1 micron, regardless of width, can be considered a porous void (see below). A void space that has a length of at least 10 microns but a width shorter than 0.1 microns is a molecular-level gap that is not considered a defect.

Typically, a crack contains open space, which may be vacuum or may contain a gas such as air, $CO_2$, $N_2$, and/or Ar. A crack may also contain solid material different from the primary material phase of the metal alloy. These sorts of cracks containing material (other than gases) may be referred to as "inclusions." The non-desirable material disposed within the inclusion may itself contain a higher porosity than the bulk material, may contain a different crystalline (or amorphous) phase of solid, or may be a different material altogether, arising from impurities during fabrication, for example. Large phase boundaries can also form inclusions. Note that these inclusions are different than the nanoparticle inclusions that are desirable for grain refining.

The metal alloy microstructure may be substantially free of porous defects, in addition to being substantially crack-free. "Substantially free of porous defects" means at least 99 vol % of the metal alloy contains no porous voids having an effective diameter of at least 1 micron.

Preferably, at least 80 vol %, more preferably at least 90 vol %, even more preferably at least 95 vol %, and most preferably at least 99 vol % of the metal alloy contains no porous voids having an effective diameter of at least 1 micron. A porous void that has an effective diameter less than 1 micron is not typically considered a defect, as it is generally difficult to detect by conventional non-destructive evaluation. Also preferably, at least 90 vol %, more preferably at least 95 vol %, even more preferably at least 99 vol %, and most preferably at least 99.9 vol % of the metal alloy contains no larger porous voids having an effective diameter of at least 5 microns. For example, see the microstructure of FIG. 3B which contains porous voids (but contains no cracks).

Typically, a porous void contains open space, which may be vacuum or may contain a gas such as air, $CO_2$, $N_2$, and/or Ar. Porous voids may be reduced or eliminated, in some embodiments. For example, additively manufactured metal parts may be hot-isostatic-pressed to reduce residual porosity, and optionally to arrive at a final additively manufactured metal part that is substantially free of porous defects in addition to being substantially crack-free.

The difference in microstructures that are substantially crack-free with equiaxed grains, versus microstructures containing cracks and non-equiaxed grains, can be seen in FIG. 1B versus 1A, as well as in FIG. 2B versus FIG. 2A, FIG. 3B versus FIG. 3A, and FIG. 5B versus FIG. 5A, as discussed in the Examples hereinbelow. Each of FIGS. 1B, 2B, 3B, and 5B show microstructures that are substantially crack-free with equiaxed grains.

The microstructure in many embodiments has a crystallographic texture that is not solely oriented in an additive-manufacturing build direction. The microstructure may contain a plurality of dendrite layers having differing primary growth-direction angles with respect to each other.

The plurality of dendrite layers (e.g., 10 or more layers) may have an average layer thickness of at least 10 microns, such as at least 20, 30, 40, 50, 75, or 100 microns.

Some variations provide a method of making a metal alloy, the method comprising:
(a) obtaining microparticles containing at least one metal;
(b) chemically and/or physically disposing grain-refining nanoparticles on surfaces of the microparticles to generate functionalized microparticles; and (c) consolidating the functionalized microparticles into a metal alloy, wherein the metal alloy has a microstructure that is substantially crack-free with equiaxed grains.

The consolidating step may include additive manufacturing, for example. An additively manufactured metal alloy may include (a) at least one base metal, such as aluminum; (b) at least one strengthening element, such as one selected from the group consisting of zinc, silicon, copper, magnesium, lithium, silver, titanium, chromium, manganese, iron, vanadium, bismuth, gallium, lead, and combinations thereof; and (c) at least one grain-refining nanoparticle, wherein the additively manufactured metal alloy has a microstructure with equiaxed grains. In various embodiments, at least one strengthening element, or a plurality of strengthening elements, is present in a concentration from about 0.01 wt % to about 20 wt %, such as about 0.1, 0.5, 1.0, 1.5, 2, 3, 4, 5, 6, 7, 8, 9, 10, 11, 12, 13, 14, or 15 wt %.

The nanofunctionalized metal precursors, and methods of using them, will now be further described in more detail, without limitation.

The nanofunctionalized metal precursors may be in the form of powder feedstocks. As intended herein, "powder feedstocks" refers to any powdered metal, ceramic, polymer, glass, composite, or combination thereof. In some embodiments, the powder feedstocks are metals or metal-containing compounds. Powder particle sizes are typically between about 1 micron and about 1 mm, but in some cases could be as much as about 1 cm.

The powdered feedstock may be in any form in which discrete particles can be reasonably distinguished from the bulk. The powder may be present as loose powders, a paste, a suspension, or a green body, for example. A green body is an object whose main constituent is weakly bound powder material, before it has been melted and solidified.

The nanofunctionalized metal precursors, whether or not initially in powder form, may be converted into a geometric object, such as a wire. A geometric object can be produced by controlling melting and solidification of the nanofunctionalized metal precursors.

Powder particles may be solid, hollow, or a combination thereof. Particles can be made by any means including, for example, gas atomization, milling, cryomilling, wire explosion, laser ablation, electrical-discharge machining, or other techniques known in the art. The powder particles may be characterized by an average aspect ratio from about 1:1 to about 100:1. The "aspect ratio" means the ratio of particle length to width, expressed as length:width. A perfect sphere has an aspect ratio of 1:1. For a particle of arbitrary geometry, the length is taken to be the maximum effective diameter and the width is taken to be the minimum effective diameter.

In some embodiments, the particles within the nanofunctionalized metal precursors (e.g., powders) are rod-shaped particles or domains resembling long sticks, dowels, or needles. The average diameter of the rod-shaped particles or domains may be selected from about 5 nanometers to about 100 microns, for example. Rods need not be perfect cylinders, i.e. the axis is not necessarily straight and the diameter is not necessarily a perfect circle. In the case of geometrically imperfect cylinders (i.e. not exactly a straight axis or a round diameter), the aspect ratio is the actual axial length, along its line of curvature, divided by the effective diameter, which is the diameter of a circle having the same area as the average cross-sectional area of the actual shape.

The nanofunctionalized metal precursor is surface-functionalized. "Surface-functionalized" and "surface functionalization" refer to a surface modification on the powdered materials, which modification affects the solidification behavior (e.g., solidification rate, yield, grain quality, heat release, etc.) of the powder materials. In various embodiments, a powdered material is functionalized with about 1%, 2%, 5%, 10%, 15%, 20%, 25%, 30%, 40%, 50%, 60%, 70%, 80%, 85%, 90%, 95%, 99%, or 100% of the surface area of the powdered material having surface-functionalization modifications. The surface modification maybe a surface-chemistry modification, a physical surface modification, or a combination thereof.

In some embodiments, the surface functionalization includes a nanoparticle coating and/or a microparticle coating. The nanoparticles and/or microparticles may include a metal, ceramic, polymer, or carbon, or a composite or combination thereof. The surface functionalization preferably includes nanoparticles that are chemically or physically disposed on the surface of the powder materials.

Nanoparticles are particles with the largest dimension between about 1 nm and about 5000 nm. A preferred size of nanoparticles is about 2000 nm or less, about 1500 nm or less, or about 1000 nm or less. In some embodiments, nanoparticles are at least 50 nm in size. Microparticles are particles with the largest dimension between about 1 micron and 1000 microns. The nanoparticle or microparticle size may be selected based on the desired properties and function of the final assembly.

Nanoparticles or microparticles may be spherical or of arbitrary shape with the largest dimension typically not exceeding the above largest dimensions. An exception is structures with extremely high aspect ratios, such as carbon nanotubes in which the dimensions may include up to 100 microns in length but less than 100 nm in diameter (for example). The nanoparticles or microparticles may include a coating of one or more layers of a different material. Mixtures of nanoparticles and microparticles may be used. In some embodiments, microparticles themselves are coated with nanoparticles, and the microparticle/nanoparticle composite is incorporated as a coating or layer on the powder material particles.

The number of nanoparticles per microparticle can vary widely. The average number of individual nanoparticles disposed on one microparticle (equivalently, the average number ratio of nanoparticles to powder microparticles) may be about 10, about $10^2$, about $10^3$, about $10^4$, about $10^5$, or about $10^6$, for example. The nanoparticle distribution on the powder particle surface can vary. In some embodiments, surface regions contain a relatively higher concentration of nanoparticles, which may be agglomerated at the surface in those regions.

The nanoparticle surface coverage may also vary widely, from about 1% to 100%, in various embodiments. The nanoparticle surface coverage is the average area fraction of powder particles that is covered by assembled nanoparticles. For example, the nanoparticle surface coverage may be about, or at least about, 1%, 5%, 10%, 20%, 30%, 40%, 50%, 60%, 70%, 80%, 90%, or 100%. Due to the small size of nanoparticles, benefits are possible with less than 1% surface area coverage.

In the case of functionalization with a nanoparticle of the same composition as the base powder, a surface-chemistry change may not be detectable and can be characterized by topological differences on the surface, for example. Functionalization with a nanoparticle of the same composition as the base powder may be useful to reduce the melting point in order to initiate sintering at a lower temperature, for example.

In some embodiments, at least 1% of the surface area of the microparticles contains nanoparticles that are chemically and/or physically disposed on the microparticle surfaces. When higher nanoparticle concentrations are desired in the final material, it is preferred that a higher surface area of the microparticles contains nanoparticles. In various embodiments, at least 1%, 2%, 5%, 10%, 20%, 30%, 40%, 50%, 60%, 70%, 80%, 90%, or 95% of the total surface area of the microparticles contains nanoparticles that are chemically and/or physically disposed on the microparticle surfaces.

In some embodiments, the microparticles have an average microparticle size from about 1 micron to about 1 centimeter. In various embodiments, the average microparticle size is about 5 microns, 10 microns, 50 microns, 100 microns, 200 microns, 500 microns, 1 millimeter, 5 millimeters, or 10 millimeters.

In various embodiments, the average nanoparticle size is about 2, 5, 10, 25, 50, 100, 200, 300, 400, 500, 1000, 2000, 3000, 4000, or 5000 nanometers.

The nanoparticles or microparticles are typically a different composition than the base powder. Nanoparticles or microparticles may include metals, hydrides, carbides, nitrides, borides, oxides, intermetallics, or other materials which upon processing form one or more of the aforementioned materials. It is possible for the chemical composition between nanoparticles and base precursor material to be the same or similar while there are differences in physical properties (particle size, phases, etc.).

In some embodiments, microparticles coat micropowders or macropowders. The micropowder or macropowder particles may include ceramic, metal, polymer, glass, or combinations thereof. The microparticles (coating) may include metal, ceramic, polymer, carbon, or combinations thereof. In the case of microparticles coating other micropowders or macropowders, functionalization preferably means that the coating particles are of significantly different dimension(s) than the base powder. For example, the microparticles may be characterized by an average dimension (e.g., diameter) that is less than 20%, 10%, 5%, 2%, or 1% of the largest dimension of the coated powders.

In some embodiments, surface functionalization is in the form of a continuous coating or an intermittent coating. A continuous coating covers at least 90% of the surface, such as about 95%, 99%, or 100% of the surface (recognizing there may be defects, voids, or impurities at the surface). An intermittent coating is non-continuous and covers less than 90%, such as about 80%, 70%, 60%, 50%, 40%, 30%, 20%, 10%, 5%, 2%, 1%, or less of the surface. An intermittent coating may be uniform (e.g., having a certain repeating pattern on the surface) or non-uniform (e.g., random).

In general, a functionalization coating may be continuous or discontinuous. The coating may have several characteristic features. In one embodiment, the coating may be smooth and conformal to the underlying surface. In another embodiment, the coating may be nodular. The nodular growth is often characteristic of kinetic limitations of nanoparticle assembly. For example, the coating may look like cauliflower or a small fractal growing from the surface. These features can be affected by the underling materials, the method of coating, reaction conditions, etc.

A coating may or may not be in the form of nanoparticles or microparticles. That is, the coating may be derived from nanoparticles or microparticles, and discrete nanoparticles or microparticles may no longer be present. Various coating techniques may be employed, such as (but not limited to) electroless deposition, immersion deposition, or solution coating. The coating thickness is preferably less than about 20% of the underlying particle diameter, such as less than 15%, 10%, 5%, 2%, or 1% of the underlying particle diameter.

In some embodiments, the surface functionalization also includes direct chemical or physical modification of the surface of the powder materials, such as to enhance the bonding of the nanoparticles or microparticles. Direct chemical modification of the surface of the powder materials, such as addition of molecules, may also be utilized to affect the solidification behavior of the powder materials. A plurality of surface modifications described herein may be used simultaneously.

In some embodiments, the nanoparticles and/or microparticles are selected to control solidification of a portion of the powdered material, such as a region of powdered material for which solidification control is desired. Other regions containing conventional powdered materials, without nanoparticles and/or microparticles, may be present. In some embodiments, the nanoparticles and/or microparticles are selected to control solidification of a portion of each the particles (e.g., less than the entire volume of a particle, such as an outer shell).

Various material combinations are possible. In some embodiments, the powder particles are ceramic and the nanoparticles and/or microparticles are ceramic. In some embodiments, the powder particles are ceramic and the nanoparticles and/or microparticles are metallic. In some embodiments, the powder particles are polymeric and the nanoparticles and/or microparticles are metallic, ceramic, or carbon-based. In some embodiments, the powder particles are glass and the nanoparticles and/or microparticles are metallic. In some embodiments, the powder particles are glass and the nanoparticles and/or microparticles are ceramic. In some embodiments, the powder particles are ceramic or glass and the nanoparticles and/or microparticles are polymeric or carbon-based, and so on.

Exemplary ceramic materials for the powders, or the nanoparticles and/or microparticles, include (but are not limited to) SiC, HfC, TaC, ZrC, NbC, WC, TiC, $TiC_{0.7}N_{0.3}$, VC, $B_4C$, $TiB_2$, $HfB_2$, $TaB_2$, $ZrB_2$, $WB_2$, $NbB_2$, TaN, HfN, BN, ZrN, TiN, NbN, VN, $Si_3N_4$, $Al_2O_3$, $MgAl_2O_3$, $HfO_2$, $ZrO_2$, $Ta_2O_5$, $TiO_2$, $SiO_2$, and oxides of rare-earth elements Y, La, Ce, Pr, Nd, Sm, Eu, Gd, Tb, Dy, Ho Er, Tm, Yb, and/or Lu.

Exemplary metallic materials for the powders, or the nanoparticles and/or microparticles, include (but are not limited to) Sc, Ti, V, Cr, Y, Zr, Nb, Mo, Ru, Rh, Pd, La, Ce, Pr, Nd, Sm, Eu, Gd, Tb, Dy, Ho Er, Tm, Yb, Lu, Ta, W, Re, Os, Ir, Pt, Si, or B.

Exemplary polymer materials for the powders, or the nanoparticles and/or microparticles, include (but are not limited to) thermoplastic organic or inorganic polymers, or thermoset organic or inorganic polymers. Polymers may be natural or synthetic.

Exemplary glass materials for the powders include (but are not limited to) silicate glasses, porcelains, glassy carbon, polymer thermoplastics, metallic alloys, ionic liquids in a glassy state, ionic melts, and molecular liquids in a glassy state.

Exemplary carbon or carbon-based materials for the nanoparticles and/or microparticles include (but are not limited to) graphite, activated carbon, graphene, carbon fibers, carbon nanostructures (e.g., carbon nanotubes), and diamond (e.g., nanodiamonds).

These categories of materials are not mutually exclusive; for example a given material may be metallic/ceramic, a ceramic glass, a polymeric glass, etc.

The selection of the coating/powder composition will be dependent on the desired properties and should be considered on a case-by-case basis. Someone skilled in the art of material science or metallurgy will be able to select the appropriate materials for the intended use, based on the information provided in this disclosure. The processing and final product configuration should also be dependent on the desired properties. Someone skilled in the art of material science, metallurgy, and/or mechanical engineering will be able to select the appropriate processing conditions for the desired outcome, based on the information provided in this disclosure.

Nanoparticles or microparticles may be attached using electrostatic forces, Van der Waals forces, chemical bonds, physical bonds, and/or any other force. A chemical bond is the force that holds atoms together in a molecule or compound. Electrostatic and Van der Waals forces are examples of physical forces that can cause bonding. A physical bond is a bond that arises when molecular entities become entangled in space. Typically, chemical bonds are stronger than physical bonds. Chemical bonds may include ionic bonds, covalent bonds, or a combination thereof.

Methods of producing nanofunctionalized metal precursor are generally not limited and may include immersion deposition, electroless deposition, vapor coating, solution/suspension coating of particles with or without organic ligands, utilizing electrostatic forces and/or Van der Waals forces to attach particles through mixing, and so on. U.S. patent application Ser. No. 14/720,757 (filed May 23, 2015), U.S. patent application Ser. No. 14/720,756 (filed May 23, 2015), and U.S. patent application Ser. No. 14/860,332 (filed Sep. 21, 2015), each commonly owned with the assignee of this patent application, are hereby incorporated by reference herein. These disclosures relate to methods of coating certain materials onto micropowders, in some embodiments.

For example, as described in U.S. patent application Ser. No. 14/860,332, coatings may be applied using immersion deposition in an ionic liquid, depositing a more-noble metal on a substrate of a less-noble, more-electronegative metal by chemical replacement from a solution of a metallic salt of the coating metal. This method requires no external electric field or additional reducing agent, as with standard electroplating or electroless deposition, respectively. The metals may be selected from the group consisting of aluminum, zirconium, titanium, zinc, nickel, cobalt copper, silver, gold, palladium, platinum, rhodium, titanium, molybdenum, uranium, niobium, tungsten, tin, lead, tantalum, chromium, iron, indium, rhenium, ruthenium, osmium, iridium, and combinations or alloys thereof. The reactive metal may be selected from the group consisting of alkali metals, alkaline earth metals, aluminum, silicon, titanium, zirconium, hafnium, zinc, and combinations or alloys thereof. In some embodiments, the reactive metal is selected from aluminum, magnesium, or an alloy containing greater than 50 at % of aluminum and/or magnesium.

Organic ligands may be reacted onto a metal, in some embodiments. Organic ligands may be selected from the group consisting of aldehydes, alkanes, alkenes, silicones, polyols, poly(acrylic acid), poly(quaternary ammonium salts), poly(alkyl amines), poly(alkyl carboxylic acids) including copolymers of maleic anhydride or itaconic acid, poly(ethylene imine), poly(propylene imine), poly(vinylimidazoline), poly(trialkylvinyl benzyl ammonium salt), poly (carboxymethylcellulose), poly(D- or L-lysine), poly(L-glutamic acid), poly(L-aspartic acid), poly(glutamic acid), heparin, dextran sulfate, 1-carrageenan, pentosan polysulfate, mannan sulfate, chondroitin sulfate, and combinations or derivatives thereof.

Metal alloy systems that utilize grain refiners give a unique microstructure for the additively manufactured metal alloy. The grain refiners may be designed with specific compositions for a given metal alloy and can be incorporated at higher concentrations than previously possible due to assembly of the grain refiners on the surface of a base metal alloy powder, as one embodiment of nanofunctionalized metal precursor. This approach enables the production of metal alloys that were heretofore difficult to process.

Some variations provide routes to controlled solidification of materials which are generally difficult or impossible to process otherwise, in additive manufacturing or other techniques. "Solidification" generally refers to the phase change from a liquid to a solid. In some embodiments, solidification refers to a phase change within the entirety of the volume of a nanofunctionalized metal precursor (e.g., powder). In other embodiments, solidification refers to a phase change at the surface of the particles or within a fractional volume of the nanofunctionalized metal precursor material. In various embodiments, at least (by volume) 1%, 2%, 5%, 10%, 15%, 20%, 25%, 30%, 40%, 50%, 60%, 70%, 80%, 90%, 95%, 99%, or 100% of the nanofunctionalized metal precursor material is melted to form the liquid state.

For a metal or mixtures of metals, solidification generally results in one or more solid metal phases that are typically crystalline, but sometimes amorphous. Ceramics also may undergo crystalline solidification or amorphous solidification. Metals and ceramics may form an amorphous region coinciding with a crystalline region (e.g., in semicrystalline materials). In the case of certain polymers and glasses, solidification may not result in a crystalline solidification. In the event of formation of an amorphous solid from a liquid, solidification refers to a transition of the liquid from above the glass-transition temperature to an amorphous solid at or below the glass-transition temperature. The glass-transition temperature is not always well-defined, and sometimes is characterized by a range of temperatures.

The materials and methods disclosed herein may be applied to additive manufacturing as well as joining techniques, such as welding. Certain unweldable metals, such as high-strength aluminum alloys (e.g., aluminum alloys Al 7075, Al 7050, or Al 2199) would be excellent candidates for additive manufacturing but normally suffer from hot cracking. The principles disclosed herein allow these alloys, and many others, to be processed with significantly reduced cracking tendency.

Certain embodiments relate specifically to additive manufacturing of aluminum alloys. Additive manufacturing has been previously limited to weldable or castable alloys of aluminum. The principles disclosed herein eliminate that limitation and enable additive manufacturing of a variety of high-strength and unweldable aluminum alloys by utilizing grain refinement to induce equiaxed microstructures which can eliminate hot cracking during processing. Potential applications include improved tooling, replacement of steel or titanium components at lower weight, full topological optimization of aluminum components, low-cost replacement for out-of-production components, and replacement of existing additively manufactured aluminum systems. Currently the only reasonably available aluminum alloys are castable Al—Si alloys, which peak in strength around 220 MPa. A high-cost alternative, Scalmalloy, is available with a reported yield of 450 MPa; however, the addition of scandium makes Scalmalloy an undesirable system. The present invention expands beyond scandium to more cost-effective grain-refining elements and demonstrates effectiveness across many metal alloy systems.

In particular, methods of this invention may be employed to produce a unique microstructure in a wide variety of alloy systems. Incorporation of previously impossible concentrations and types of grain refiners is possible, as taught in this disclosure, due to grain-refining elements being disposed on surfaces of base alloy powder (or other nanofunctionalized metal precursor). This process utilizes functionalization to incorporate grain refiners directly at the site of melting, negating the need for expensive processing and making use of commercially available alloy powders, wires, and other off-the-shelf materials. This technique is in contrast to incorporation of grain refiners into the internal regions of powder particles, which requires extremely high temperatures during gas atomization. Such high temperatures can cause volatility of certain alloying elements (including Zn, Mg, and Li), and can be damaging to equipment due to the high reactivity of some elements in metal alloys.

Some embodiments of the present invention utilize materials, methods, and principles described in commonly owned U.S. patent application Ser. No. 15/209,903, filed Jul. 14, 2016, U.S. patent application Ser. No. 15/808,872, filed Nov. 9, 2017, U.S. patent application Ser. No. 15/808,877, filed Nov. 9, 2017, and/or U.S. patent application Ser. No. 15/808,878, filed Nov. 9, 2017, each of which is hereby incorporated by reference herein. For example, certain embodiments utilize functionalized powder feedstocks as described in U.S. patent application Ser. No. 15/209,903. The present disclosure is not limited to those functionalized powders. This specification also hereby incorporates by reference herein Martin et al., "3D printing of high-strength aluminium alloys," *Nature* vol. 549, pages 365-369 and supplemental online content (extended data), Sep. 21, 2017, in its entirety.

In some embodiments, micropowders are functionalized with assembled nanoparticles that are lattice-matched to a primary or secondary solidifying phase in the parent material, or that may react with elements in the micropowder to form a lattice-matched phase to a primary or secondary solidifying phase in the parent material. In certain embodiments, mixtures of assembled nanoparticles may react with each other or in some fashion with the parent material, to form a lattice-matched material having the same or similar function. For example, alloy powder feedstock particles may be decorated with lattice-matched nanoparticles that heterogeneously nucleate the primary equilibrium phases during cooling of the melt pool. The same concept may be applied to nanofunctionalized metal precursors besides powders (e.g., wires).

By providing a high density of low-energy-barrier heterogeneous nucleation sites ahead of the solidification front, the critical amount of undercooling needed to induce equi-axed growth is decreased. This allows for a fine equiaxed grain structure that accommodates strain and prevents cracking under otherwise identical solidification conditions. Additive manufacturing of previously unattainable high-performance alloys, such as Al 7075 or Al 6061, is made possible with improved properties over currently available systems.

In preferred embodiments, during melting, the functionalized particles are incorporated into the melt and aid in the nucleation of new grains due to lattice matching, decreasing the critical amount of undercooling necessary for nucleation. In the absence of grain refiners, the high thermal gradient produced during additive manufacturing induces columnar growth. This is a serious problem during manufacturing of crack-susceptible metal or alloy systems. The columnar growth traps interdendritic liquid and leads to cavitation and cracking. Forcing equiaxed growth decreases the coherency of dendrites and enables a reduced crack tendency. A dendrite is a characteristic tree-like structure of crystals produced by faster growth of crystals along energetically favorable crystallographic directions as molten metal freezes.

In some embodiments, a method of controlling solidification of a powdered material comprises:

providing a powdered material comprising a plurality of particles, wherein the particles are fabricated from a first material, and wherein each of the particles has a particle surface area that is surface-functionalized with nanoparticles and/or microparticles;

melting at least a portion of the powdered material to a liquid state; and semi-passively controlling solidification of the powdered material from the liquid state to a solid state.

As intended in this description, "semi-passive control," "semi-passively controlling," and like terminology refer to control of solidification during heating, cooling, or both heating and cooling of the surface-functionalized powder materials, wherein the solidification control is designed prior to melting through selected functionalization and is not actively controlled externally once the melt-solidification process (e.g., additive manufacturing) has begun. Note that external interaction is not necessarily avoided. In some embodiments, semi-passive control of solidification further includes selecting the atmosphere (e.g., pressure, humidity, or gas composition), temperature, or thermal input or output. These factors as well as other factors known to someone skilled in the art may or may not be included in semi-passive control.

One route to control nucleation is the introduction, into the liquid (melt) phase, of nanoparticles derived from a coating described above. The nanoparticles may include any material composition described above and may be selected, in part, based on their ability to wet into the melt. Upon melt initiation, the nanoparticles wet into the melt pool as dispersed particles which, upon cooling, serve as nucleation sites, thereby producing a fine-grained structure with observable nucleation sites in a solidified cross-section. In some embodiments, the density of nucleation sites is increased, which may increase the volumetric freezing rate due to the number of growing solidification fronts and the lack of a nucleation energy barrier.

In an exemplary embodiment, ceramic nanoparticles, e.g. $TiB_2$ or $Al_2O_3$ nanoparticles, are coated onto aluminum alloy microparticles. The ceramic nanoparticles may be introduced into an aluminum alloy melt pool in an additive manufacturing process. The nanoparticles then disperse in the melt pool and act as nucleation sites for the solid. The additional well-dispersed nucleation sites can mitigate shrinkage cracks (hot cracking). Shrinkage cracks typically occur when liquid cannot reach certain regions due to blockage of narrow channels between solidifying grains. An increase in nucleation sites can prevent formation of long, narrow channels between solidifying grains, because multiple small grains are growing, instead of few large grains.

In another exemplary embodiment, nanoparticles act as nucleation sites for a secondary phase in an alloy. The nanoparticles may comprise the secondary phase or a material that nucleates the secondary phase (due to similar crystal structures, for instance). This embodiment can be beneficial if the secondary phase is responsible for blocking interdendritic channels leading to hot cracking. By nucleating many small grains of the secondary phase, a large grain that might block the narrow channel between the dendrites can be avoided. Furthermore, this embodiment can be beneficial if the secondary phase tends to form a continuous phase between the grains of the primary phase, which promotes stress corrosion cracking. By providing additional nucleation sites for the secondary phase, this secondary phase may be broken up and interdispersed, preventing it from forming a continuous phase between grains of the primary alloy. By breaking up a secondary phase during solidification, there is the potential to more completely homogenize the material during heat treatment, which can decrease the likelihood of stress corrosion cracking (fewer gradients in the homogenized material). If the secondary phase is not continuous, long notches from corrosion are less likely.

In another embodiment of nucleation control, the functionalized surface may fully or partially dissolve in the melt and undergo a reaction with materials in the melt to form precipitates or inclusions, which may act in the same manner as the nanoparticles in the preceding paragraph. For example, titanium particles may be coated on an aluminum alloy particle, which upon melting would dissolve the titanium. However, on cooling the material undergoes a reaction, forming aluminum-titanium intermetallic ($Al_3Ti$) inclusions which would serve as nucleation sites.

In another embodiment, the coating may react with impurities to form nucleation sites. An example is a magnesium coating on a titanium alloy powder. Titanium has a very high solubility of oxygen (a common atmospheric contaminant), which can affect the overall properties. A coating of magnesium reacts within the melt, binding to dissolved oxygen which forms magnesium oxide (MgO) inclusions, promoting nucleation.

Nucleation control may include the use of ceramic particles. In some embodiments, the ceramic particles can be wet by the molten material, while in other embodiments, the ceramic particles cannot be wet by the molten material. The ceramic particles may be miscible or immiscible with the molten state. The ceramic particles may be incorporated into the final solid material. In some embodiments, the ceramic particles are rejected from the solid. Exemplary ceramic materials include (but are not limited to) SiC, HfC, TaC, ZrC, NbC, WC, TiC, $TiC_{0.7}N_{0.3}$, VC, $B_4C$, $TiB_2$, $HfB_2$, $TaB_2$, $ZrB_2$, $WB_2$, $NbB_2$, TaN, HfN, BN, ZrN, TiN, NbN, VN, $Si_3N_4$, $Al_2O_3$, $MgAl_2O_3$, $HfO_2$, $ZrO_2$, $Ta_2O_5$, $TiO_2$, $SiO_2$, and oxides of rare-earth elements Y, La, Ce, Pr, Nd, Sm, Eu, Gd, Tb, Dy, Ho Er, Tm, Yb, and/or Lu.

Nucleation control may include the use of metallic particles. In some embodiments, the metallic particles can be wet by the molten material. The metallic particles may form an alloy with the molten material through a reaction. The alloy may be an intermetallic compound or a solid solution. In some embodiments, the metallic particles cannot be wet by the molten material and cannot form an alloy with the molten material. Exemplary metallic materials include (but are not limited to) Sc, Ti, V, Cr, Y, Zr, Nb, Mo, Ru, Rh, Pd, La, Ce, Pr, Nd, Sm, Eu, Gd, Tb, Dy, Ho Er, Tm, Yb, Lu, Ta, W, Re, Os, Ir, Pt, Si, or B.

Generally, nucleation-promoting chemical reactions are dependent on the selected surface functionalization and on the heating (or cooling) parameters. Nanoparticles promote surface growth of crystals that have good epitaxial fit. Nucleation on the surface of a nanoparticle is more likely when there is good fit between the crystal lattice parameters of the nanoparticles and the solidifying material. Nanoparticles may be selected to promote nucleation of a specific phase in the melt.

In some embodiments, at least one nanoparticle is lattice-matched to within ±5% compared to powder feedstock without the nanoparticle. Preferably, the nanoparticle is lattice-matched to within ±2%, more preferably to within ±0.5%, compared to a powder feedstock without the nanoparticle.

In some embodiments, at least one nanoparticle is atomic density-matched to within ±25% compared to a powder feedstock without the nanoparticle. Preferably, the nanoparticle is atomic density-matched to within ±5%, more preferably to within ±0.5%, compared to a powder feedstock without the nanoparticle.

As nanoparticles or microparticles are organized on a particle surface under conditions for which rapid melting or near melting occurs and rapidly fuses the particles together with very little melt convection, the coating will not have the time or associated energy to diffuse away from its initial position relative to the other powders. This would in turn create a three-dimensional network structure of inclusions. Thus, a method is provided to control maximum grain size and/or to design a predictable microstructure. The microstructure is dependent on the initial powder size, shape, and packing configuration/density. Adjusting the coating and powder parameters allows control of this hierarchical structure. In some embodiments, these architectures significantly improve material properties by impeding, blocking, or redirecting dislocation motion in specific directions, thereby reducing or eliminating failure mechanisms.

Utilizing the appropriate functionalization, the heat flow during solidification may be controlled using heats of fusion or vaporization. In some embodiments, inclusions are pulled into the melt or reacted within the melt (as described above). In some embodiments, a coating is rejected to the surface of the melt pool. Utilizing a functionalization surface with a high vapor pressure at the desired melting point of the powder, vaporization would occur, resulting in a cooling effect in the melt which increases the freezing rate. As described above, magnesium on a titanium alloy may accomplish this, in addition to forming oxide inclusions. The effect of this is detectable when comparing non-functionalized powders to functionalized powders under identical conditions, as well as comparing the composition of feed material versus the composition of the final product.

In another embodiment, the opposite effect occurs. Some systems may require slower solidification times than can be reasonably provided in a certain production system. In this instance, a higher-melting-point material, which may for example be rejected to the surface, freezes. This releases the heat of fusion into the system, slowing the total heat flux out of the melt. Heat may also be held in the melt to slow solidification by incorporating a secondary material with a significantly higher heat capacity.

In some embodiments, the heat of formation is used to control heat flow during melt pool formation and/or solidification. For example, nickel microparticles may be decorated with aluminum nanoparticles. Upon supply of enough activation energy, the exothermic reaction of Ni and Al to NiAl is triggered. In this case, a large heat of formation is released (−62 kJ/mol) which may aid in melting the particles fully or partially. The resulting NiAl intermetallic is absorbed into the melt and stays suspended as a solid (a portion may be dissolved) due to its higher melting point, thereby acting as a nucleation site as well as having a strengthening effect on the alloy later.

Thermodynamic control of solidification may utilize nanoparticles or surface coatings that undergo a phase transformation different from phase transformations in the base material. The phase transformations may occur at different solidus and/or liquidus temperatures, at similar solidus and/ or liquidus temperatures, or at the same solidus and/or liquidus temperatures. The phase-transformed nanoparticles or surface coatings may be incorporated into the final solid material, or may be rejected from the final solid material, or both of these. The phase-transformed nanoparticles or surface coatings may be miscible or immiscible with the molten state. The phase-transformed nanoparticles or surface coatings may be miscible or immiscible with the solid state.

Thermodynamic control of solidification may utilize nanoparticles or surface coatings which vaporize or partially vaporize. For example, such coatings may comprise organic materials (e.g., waxes, carboxylic acids, etc.) or inorganic salts (e.g., $MgBr_2$, $ZnBr_2$, etc.). Thermodynamic control of solidification may utilize nanoparticles or surface coatings which release or absorb gas (e.g., oxygen, hydrogen, carbon dioxide, etc.). Thermodynamic control of solidification may utilize nanoparticles or surface coatings with different heat capacities than the base material.

In addition to controlling the energy within the system, it also is possible to control the rate at which heat leaves the system by controlling thermal conductivity or emissivity (thermal IR radiation). This type of control may be derived from a rejection to the surface or from the thermal conductivity of a powder bed during additive manufacturing, for instance. In one embodiment, the functionalization may reject to the surface a low-conductivity material, which may be the functionalization material directly or a reaction product thereof, which insulates the underlying melt and decreases the freezing rate. In other embodiments, a layer may have a high/low emissivity which would increase/decrease the radiative heat flow into or out of the system. These embodiments are particularly applicable in electron-beam systems which are under vacuum and therefore radiation is a primary heat-flow mechanism.

Additionally, in laser sintering systems, the emissivity of a rejected layer may be used to control the amount of energy input to the additive manufacturing precursor (e.g., powder) bed for a given wavelength of laser radiation. In another embodiment, the functionalized surface may be fully absorbed in the melt yet the proximity to other non-melted functionalized powders may change the heat conduction out of the system. This may manifest itself as a low-thermal-conductivity base powder with a high-conductivity coating.

Thermal conductivity or emissivity control of solidification may utilize nanoparticles or surface coatings which are higher in thermal conductivity compared to the base material. The nanoparticles may be incorporated into the melt, or may be rejected, such as to grain boundaries or to the surface of the melt. The nanoparticles or surface coatings may be miscible or immiscible with the molten state and/or with the final solid state.

Thermal conductivity or emissivity control of solidification may utilize nanoparticles or surface coatings which are lower in thermal conductivity compared to the base material. Thermal conductivity or emissivity control of solidification may utilize nanoparticles or surface coatings which are higher in emissivity compared to the base material. Thermal conductivity or emissivity control of solidification may utilize nanoparticles or surface coatings which are lower in emissivity compared to the base material.

In some embodiments, the functionalization material may react with contaminants in the melt (e.g., Mg—Ti—O system). When the functionalization material is properly chosen, the reacted material may be selected such that the formed reaction product has a high surface tension with the liquid, such that it may be rejected to the surface. The rejected reaction product may take the form of an easily removable scale. Optionally, the rejected layer is not actually removed but rather incorporated into the final product. The rejected layer may manifest itself as a hard-facing carbide, nitride, or oxide coating, a soft anti-galling material, or any other functional surface which may improve the desired properties of the produced material. In some cases, the rejected surface layer may be of a composition and undergo a cooling regime which may result in an amorphous layer on the surface of the solidified material. These surface-rejected structures may result in improved properties related to, but not limited to, improved corrosion resistance, stress corrosion crack resistance, crack initiation resistance, overall strength, wear resistance, emissivity, reflectivity, and magnetic susceptibility.

Through contaminant removal or rejection, several scenarios are possible. Nanoparticles or surface coatings that react with or bind to undesired contaminants may be incorporated into the solidification, in the same phase or a separate solid phase. The reacted nanoparticles or surface coatings may be rejected during solidification. When portions or selected elements present in the nanoparticles or surface coatings react with or bind to contaminants, such portions or elements may be incorporated and/or rejected.

In some embodiments, the functionalized surface reacts upon heating to form a lower-melting-point material compared to the base material, such as through a eutectic reaction. The functionalized surface may be chosen from a material which reacts with the underlying powder to initiate melting at the particle surface, or within a partial volume of the underlying powder. A heat source, such as a laser or electron beam, may be chosen such that the energy density is high enough to initiate the surface reaction and not fully melt the entire functionalized powder. This results in an induced uniform liquid phase sintering at the particle surface. Upon freezing, the structure possesses a characteristic microstructure indicating different compositions and grain nucleation patterns around a central core of stock powder with a microstructure similar to the stock powder after undergoing a similar heat treatment. This structure may later be normalized or undergo post-processing to increase density or improve the properties.

In some embodiments, one component melts and this melted material diffuses into a second nanoparticle or microparticle, to form an alloyed solid. This new alloyed solid may then act as a phase-nucleation center, or may limit melting just at the edge of particles.

Incorporating nanoparticles into a molten metal may be challenging when the nanoparticles have a thin oxide layer at the surface, since liquid metals typically do not wet oxides well. This may cause the nanoparticles to get pushed to the surface of the melt. One way to overcome the oxide layer on nanoparticles, and the associated wettability issues, is to form the nanoparticles in situ during melt pool formation. This may be achieved by starting with nanoparticles of an element that forms an intermetallic material with one component of the base alloy, while avoiding dissolution of the nanoparticles in the melt. Alternatively, binary compound nanoparticles that disassociate at elevated temperatures, such as hydrides or nitrides, may be used since the disassociation reaction annihilates any oxide shell on the nanoparticle.

As noted above, the surface functionalization may be designed to be reacted and rejected to the surface of the melt pool. In embodiments employing additive manufacturing, layered structures may be designed. In some embodiments, progressive build layers and hatchings may be heated such that each sequential melt pool is heated long enough to reject the subsequent rejected layer, thereby producing a build with an external scale and little to no observable layering within the build of the rejected materials. In other embodiments, particularly those which result in a functional or desired material rejected to the surface, heating and hatching procedures may be employed to generate a composite structure with a layered final product. Depending on the build parameters, these may be randomly oriented or designed, layered structures which may be used to produce materials with significantly improved properties.

Architected microstructures may be designed in which feature sizes (e.g., distance between nanoparticle nodes) within the three-dimensional network are selected, along with targeted compositions, for an intended purpose. Similarly, layered composite structures may be designed in which feature sizes (e.g., layer thicknesses or distance between layers) are selected, along with targeted compositions, for an intended purpose.

Functionalized surfaces may be relatively immobile from their initial position on the surface of the base powder. During melting, these functionalized surfaces may act as nucleation sites, as previously mentioned; however, instead of absorption into the melt, they may initiate nucleation at the location which was previously occupied by the powder surface and is not molten. The result is a fine-grained structure evolving from the surface nucleation source, towards the center. This may result in a designed composite structure with enhanced properties over the base material. In general, this mechanism allows for the ability to control the location of desired inclusions through controlled solidification.

In the additive manufacturing of titanium alloys, the problem of microstructural texturing of subsequent layers of molten metals induces anisotropic microstructures and thus anisotropic structural properties. Dispersing stable ceramic nanoparticles in the solidifying layers may produce grain structures with isotropic features which are stable upon repetitive heating cycles. An example is a stable high-temperature ceramic nanoparticle, such as $Al_2O_3$ or TiCN attached to the surface of a Ti-6Al-4V microparticle powder which is subsequently melted, solidified, and then reheated as the next layer of powder is melted on top. The ceramic nanoparticles can induce nucleation of small grains and prevent coarse grains from forming in the direction of the thermal gradient.

In some embodiments, the solid state of nanofunctionalized material is a three-dimensional microstructure containing the nanoparticles and/or microparticles as inclusions distributed throughout the solid state. In some embodiments, the solid state of a nanofunctionalized material is a layered microstructure containing one or more layers comprising the nanoparticles and/or microparticles.

The method may further include creating a structure through one or more techniques selected from the group consisting of additive manufacturing, injection molding, pressing and sintering, capacitive discharge sintering, isostatic pressing, and spark plasma sintering. Also, a plurality of parts (e.g., additively manufactured parts) may be joined to fabricate an overall product. The present invention provides a solid object or article comprising a structure produced using such methods.

In some embodiments, the nanoparticles or surface coatings are rejected, creating a scale. The scale may be unbonded to the structure. In some embodiments, the scale bonds to the structure or otherwise cannot be readily removed. This may be advantageous, such as to provide a structural enhancement—for instance, rejected ceramic particles may add a hard facing to the final structure. A rejected nanoparticle or surface coating may form a multilayer composite, wherein each layer has a different composition. In some embodiments, a rejected nanoparticle or surface coating forms a spatially graded composition within the bulk of the structure.

A three-dimensional architecture may develop in the final additively manufactured microstructure. A "three-dimensional architecture" means that the nanoparticles are not randomly distributed throughout the additively manufactured part. Rather, in a three-dimensional architecture of nanoparticles, there is some regularity in spacing between nanoparticles, in space (three dimensions). The average spacing between nanoparticles may vary, such as from about 1 nanoparticle diameter to about 100 nanoparticle diameters or more, depending on the nanoparticle concentration in the material.

In some embodiments, the three-dimensional architecture of nanoparticles in the additively manufactured part is correlated to the distribution of nanoparticles within the starting composition (functional microparticles, i.e. metal-containing microparticles with nanoparticles on surfaces). Such a three-dimensional architecture of nanoparticles is possible when the kinetics during melting and solidification are controlled such that the integrity and dispersion of nanoparticles are preserved.

In some embodiments, the nanoparticles do not melt and do not significantly disperse from the original dispositions, relative to each other, following melting of the metal(s) and then during solidification. In certain embodiments, the nanoparticles melt, soften (such as to become a glass), or form a liquid-solution solution, yet do not significantly disperse from the original dispositions, relative to each other, following melting of the metal(s) and/or during solidification. When such nanoparticles resolidify (or undergo a phase transition) during solidification of the melt, they assume their original dispositions or approximate coordinates thereof. In some embodiments, whether or not the nanoparticles melt, the nanoparticles end up in a three-dimensional architecture in which the locations of nanoparticles are different than the original dispositions, but may be correlated and therefore predictable based on the starting functionalized feedstock.

Some variations provide a solid metal alloy object or article comprising at least one solid phase derived from a liquid form of a powdered material as described. The solid phase may form from 0.25 wt % to 100 wt % of the solid object or article, such as about 1 wt %, 5 wt %, 10 wt %, 25 wt %, 50 wt %, or 75 wt % of the solid object or article, for example.

Other variations provide a solid metal alloy object or article comprising a continuous solid phase and a three-dimensional network of nanoparticle and/or microparticle inclusions distributed throughout the continuous solid phase, wherein the three-dimensional network blocks, impedes, or redirects dislocation motion within the aluminum alloy object or article.

In some embodiments, nanoparticle and/or microparticle inclusions are distributed uniformly throughout the continuous solid phase of a metal alloy. The nanoparticle and/or microparticle inclusions may be present at a concentration from about 0.1 wt % to about 50 wt % of the solid object or article, such as about 1, 2, 5, 10, 15, 20, 25, 30, 35, 40, or 45 wt %, for example.

In some embodiments, light elements are incorporated into a metal alloy or into a additively manufactured part incorporating a metal alloy. For example, the particle surface (or the surface of nanoparticles or microparticles present on the powder particles) may be surface-reacted with an element selected from the group consisting of hydrogen, oxygen, carbon, nitrogen, boron, sulfur, and combinations thereof, or essentially any other element(s) as desired. For example, reaction with hydrogen gas may be carried out to form a metal hydride. Optionally, the particle or a particle coating further contains a salt, carbon, an organic additive, an inorganic additive, or a combination thereof. Certain embodiments utilize relatively inert carbides that are incorporated (such as into steel) with fast melting and solidification.

Some possible powder metallurgy processing techniques that may be used, beyond additive manufacturing, include hot pressing, cold pressing, low-pressure sintering, extrusion, pressureless sintering, and metal injection molding, for example. Melting may include induction melting, resistive melting, skull melting, arc melting, laser melting, electron beam melting, semi-solid melting, or other types of melting (including convention and non-conventional melt processing techniques). Casting may include centrifugal, pour, or gravity casting, for example. Sintering may include spark discharge, capacitive-discharge, resistive, or furnace sintering, for example. Mixing may include convection, diffusion, shear mixing, or ultrasonic mixing, for example.

The final additively manufactured article may have porosity from 0% to about 75%, such as about 5%, 10%, 20%, 30%, 40%, 50%, 60%, or 70%, in various embodiments. The porosity may derive from space both within particles (e.g., hollow shapes) as well as space outside and between particles. The total porosity accounts for both sources of porosity.

The final additively manufactured article may be selected from the group consisting of a structure, a coating, a geometric object, a billet, an ingot, a net-shape part, a near-net-shape part, a welding filler, and combinations thereof. Essentially the geometry of an additive manufacturing part is unlimited.

In some embodiments, the additively manufactured part is a metal matrix nanocomposite. A "metal matrix nanocomposite" is a metal-containing material with greater than 0.1 wt % nanoparticles distributed in a metal matrix or otherwise within the metal-containing material. Nanocomposites have been shown to exhibit enhanced mechanical strength due to the ability to impede dislocation motion. This ability is not limited to room temperature and can improve a material's high-temperature strength and creep resistance. Nanocomposites can also improve wear and fouling resistance in certain sliding and high-friction environments.

Some embodiments produce or employ a functionally graded metal matrix nanocomposite, as part of, or all of, a metal alloy. As intended herein, a "functionally graded metal matrix nanocomposite" is a metal matrix nanocomposite that exhibits a spatial gradient of one or more properties, derived from some spatial variation, within the metal matrix, of a nanoparticle or nanoparticle phase. The property that varies may be mechanical, thermal, electrical, photonic, magnetic, or any other type of functional property.

Metal matrix nanocomposites may be produced with arbitrary composition and with control of nanoparticle volume fraction. Starting with functionalized feedstocks as described above, a low or high volume fraction of nanoparticles may be achieved. There may be a uniform or non-uniform distribution of nanoparticles within the matrix, by utilizing conventional, low-cost powder metallurgy approaches and ingot processing.

Some variations provide a metal matrix nanocomposite composition comprising metal-containing microparticles and nanoparticles, wherein the nanoparticles are chemically and/or physically disposed on surfaces of the microparticles, and wherein the nanoparticles are consolidated in a three-dimensional architecture throughout the composition.

In some embodiments, the additively manufactured part is an ingot, for later producing a metal matrix nanocomposite or another material. An "ingot" or equivalently "pre-dispersed ingot" means a raw material that contains both a metal component and a pre-dispersed reinforcing nanoparticle component. In some embodiments, the ingot already contains a functional gradient of nanoparticle density. In some embodiments, the ingot has or contains a microstructure indicative of a material which consisted of powders with nanoparticle surface functionalization. This will result in a 3D network of nanoparticles in the ingot. An ingot may be a green body or a finished body. Ingot relative densities may range from 10% to 100%, for example, calculated as a percentage of the theoretical density (void-free) of the components contained in the ingot.

In some embodiments, the additively manufactured article is a master alloy. A "master alloy" is well-defined in the art and refers to a concentrated alloy source which can be added to a metal being processed, to introduce the appropriate alloying elements into the system. Master alloys are particularly useful when the alloying elements are difficult to disperse or in low weight quantities. In the case of the dispersion difficulties, pre-dispersed master alloys increase wetting and avoid agglomeration. In the case of low quantities, it is much easier to control additions when heavier weights of pre-alloyed material can be added, to avoid weighing errors for the minor alloying elements. The master alloy may ultimately be processed into various metal alloys, or final parts, by a variety of processes. Metal-part forming operations include, but are not limited to, forging, rolling, extrusion, drawing, sand casting, die casting, investment casting, powder metallurgy, additive manufacturing, or others.

In some embodiments, the additively manufactured part has a density from about 1 g/cm$^3$ to about 20 g/cm$^3$, such as about 2, 3, 4, 5, 6, 7, 8, 9, 10, 11, 12, 13, 14, or 15 g/cm$^3$.

The final additively manufactured article may have a cast microstructure, in some embodiments. By a "cast microstructure" it is meant that the additively manufactured article is characterized by a plurality of dendrites and grain boundaries within the microstructure. In some embodiments, there is also a plurality of voids, but preferably no cracks or large phase boundaries. A dendrite is a characteristic tree-like structure of crystals produced by faster growth of crystals along energetically favorable crystallographic directions as molten metal solidifies.

Note that while casting is a metal processing technique, a cast microstructure is a structural feature, not necessarily tied to any particular process to make the microstructure. A cast microstructure can certainly result from freezing (solidification) of molten metal or metal alloy. However, metal solidification can result in other microstructures, and cast microstructures can arise from other metal-forming techniques. Metal processes that do not rely at all on melting and solidification (e.g., forming processes) will not tend to produce a cast microstructure.

A cast microstructure can generally be characterized by primary dendrite spacing, secondary dendrite spacing, dendritic chemical segregation profile, grain size, shrinkage porosity (if any), percent of secondary phases, composition of secondary phases, and dendritic/equiaxed transition, for example.

In some embodiments, a cast microstructure is further characterized by an equiaxed, fine-grained microstructure. Equiaxed grains can result when there are many nucleation sites arising from the plurality of nanoparticles contained on surfaces of microparticles, in the nanofunctionalized precursor and in the final additively manufactured article.

In some embodiments, a cast microstructure is further characterized by a dispersed microstructure. A dispersed microstructure generally arises from the large number of dendrites and grain boundaries within the microstructure, which in turn arise from the large number of nanoparticles on surfaces of microparticles. The degree of dispersion may be characterized by a dispersion length scale, calculated as the average spacing between nanoparticles and/or the average length scale in the metal phase between nanoparticles. In various embodiments, the dispersion length scale is from about 1 nanometer to about 100 microns, such as from about 10 nanometers to about 10 microns, or about 100 nanometers to about 1 micron.

Optionally, porosity may be removed or reduced in a cast microstructure. For example, a secondary heat and/or pressure (or other mechanical force) treatment may be done to minimize porous voids present in the additively manufactured article. Also, pores may be removed from the additively manufactured article by physically removing (e.g., cutting away) a region into which porous voids have segregated.

In addition to removal of voids, other post-working may be carried out, potentially resulting in other final microstructures that are not cast microstructures, or that contain a mixture of microstructures. For example, forging can refine defects and can introduce additional directional strength, if desired. Preworking (e.g., strain hardening) can be done such as to produce a grain flow oriented in directions requiring maximum strength. The final microstructure therefore may be a forged microstructure, or a mixed cast/forged microstructure, in certain embodiments. In various embodiments, the additively manufactured article, on a volume basis, is at least 10%, 25%, 50%, 75%, 90%, 95%, 99%, or 100% cast microstructure.

EXAMPLES

Materials. Aluminum alloy 7075 micropowder is purchased from Valimet Inc. (Stockton, Calif., U.S.). The powder consists of Al (balance), Zn (5.40%), Mg (2.25%), Cu (1.54%), Cr (0.19%), Fe (0.17%), Si (0.13%), Mn (0.02%), and Ti (<0.01%), in weight percent. The particle size distribution was bimodal with peak values at 45 µm and 15 µm. Aluminum alloy 6061 micropowder is purchased from Valimet Inc. The powder consists of Al (balance), Mg (0.83%), Si (0.62%), Fe (0.25%), Cu (0.23%), Cr (0.08%), Mn (0.04%), Zn (0.04%), and Ti (0.02%), in weight percent. The average particle size is 45 µm. CL31 aluminum-silicon-magnesium alloy micropowder is purchased from Concept Laser (Grapevine, Tex., U.S.). The powder consists of Al (balance), Si (9.0-10.0%), Mg (0.2-0.45%), Fe (<0.55%, trace), Mn (<0.45%, trace) and Ti (<0.15%, trace), in weight percent. Particle size is optimized for selective laser melting and proprietary to the manufacturer. Hydrogen-stabilized zirconium ($ZrH_2$ powder) is purchased from US Research Nanomaterials Inc. (Houston, Tex., U.S.).

Selective Laser Melting. Additive manufacturing of stock aluminum alloy and functionalized aluminum alloy powders is performed on a Concept Laser M2 selective laser melting machine with single-mode, CW modulated ytterbium fiber laser (1070 nm, 400 W), scan speed up to 7.9 m/s, spot size 50 µm minimum. Powder handling parameters: 80 mm×80 mm build chamber size, 70 mm×70 mm build plate size, 20-80 µm layer thickness. The atmosphere is Ar or $N_2$, <0.1% $O_2$. Samples consist of 60 mm×20 mm×40 mm tensile block specimens and 10 mm×10 mm×40 mm blocks for examining microstructure. Samples are processed with the Concept Laser 'islanding' scan strategy, which was specifically developed for the CL31 AlSi10Mg alloy material to minimize thermal and residual stress build-up in the part. Islands that compose the core of the build geometry are 2 mm×2 mm in size. The 70 mm×70 mm build plates are machined out of aluminum alloy 6061 and sandblasted on the surface. Layers of the build are incremented by a range from 25 µm to 80 µm depending on part geometry and location in the build. Processing is done under a flowing, inert argon atmosphere with oxygen monitoring. All processing is completed at room temperature with no applied heat to the build plate. Samples are removed from the machine and cleaned of extra powder by sonicating in water. Parts are then dried with clean, compressed, dry air.

Heat Treatment. Samples are then heat treated to a "T6" condition. Samples are solutionized at 480° C. in air with a ramp rate of 5° C./min for 2 h and then quenched with water at 25° C. Samples are subsequently aged at 120° C. with a ramp rate of 4° C./min in air for 18 h and allowed to cool to room temperature.

Sectioning and Sample Preparation. All samples are removed from the build plates via wire electro discharge machining (EDM). Tensile specimens are sectioned with wire EDM to a thickness of 2 mm. Tensile specimens are prepared for mechanical testing by polishing the surfaces of the gauge section with 240, 360, 400, 800 and 1,200 grit sandpaper by hand. One side of the mechanical test samples is painted with white and spackled with black paint with an airbrush for digital image correlation using a GOM ARAMIS-3D Motion and Deformation Sensor. Microstructure blocks are sectioned with a water-cooled saw and mounted in epoxy resin for polishing. Grinding is done with 240, 360, 400, 800 and 1,200 grit sand paper. Final polishing of the samples is accomplished with 1-µm diamond and 50-nm $Al_2O_3$ polishing compounds from PACE Technologies. Some polished samples are etched with Keller's Etch for 10 s to reveal microstructure. Additional imaging is conducted using SEM and electron backscatter diffraction (EBSD).

Materials Characterization. To observe microstructural differences, mounted samples are observed with an optical microscope under polarized light and with scanning electron microscopy (SEM).

Mechanical Testing. Tensile tests are performed on a servo-electric INSTRON 5960 frame equipped with a 50-kN load cell (INSTRON). Samples are clamped by the ends of the dog-bone-shaped samples. The extension rate is 0.2 mm/min and samples are loaded until fracture. Testing is conducted following ASTM E8. A U-joint is used to account for any misalignment in the sample. Because cracking tends to orient parallel to the additive manufacturing build direction, tensile testing is conducted perpendicular to the expected crack orientation. This ensures that any residual cracks have the maximum effect on the tensile properties. Observed ductility in the nanoparticle-functionalized material indicates a complete elimination of deleterious cracking.

Example 1: Grain Refinement of Pure Aluminum in Additive Manufacturing

In this example, tantalum (Ta) particles are added to pure aluminum as a grain refiner, and compared to pure aluminum with no Ta particle addition. The concentration of Ta in the aluminum-tantalum material is about 1 vol %. The average Ta particle size is approximately 50 nm. In both cases, the metal or functionalized metal is additively manufactured by selective laser melting as described above.

Figure 1B:
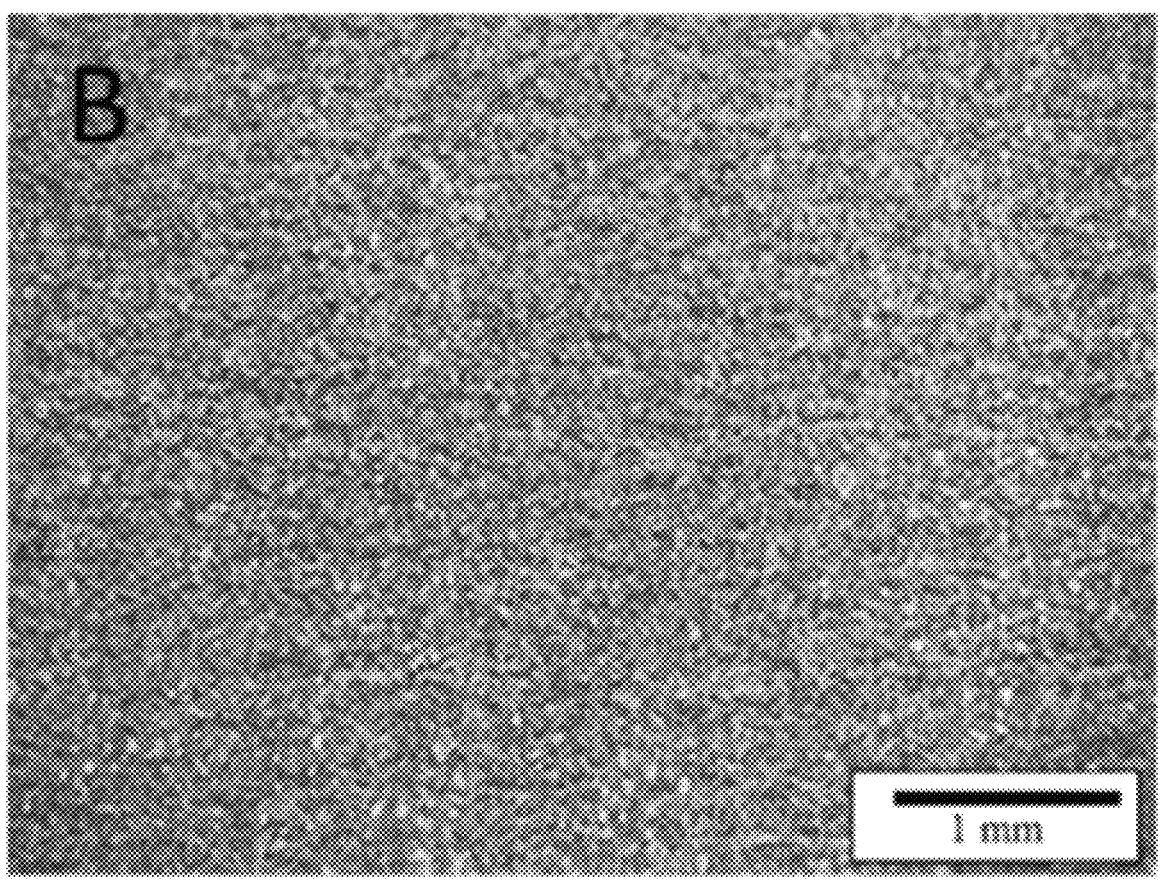
FIG. 1B shows an optical image of additively manufactured, grain-refined aluminum with Ta particles, revealing fine equiaxed growth and a substantially crack-free microstructure, in Example 1 herein.

FIG. 1A shows an image of non-grain-refined pure aluminum, revealing large columnar grains. FIG. 1B shows an image of grain-refined aluminum with Ta particles, revealing fine equiaxed growth and a substantially crack-free microstructure.

This example demonstrates the effectiveness of grain refinement of pure aluminum using Ta addition, for additive manufacturing.

Example 2: Grain Refinement of Aluminum Alloy Al 7075 in Additive Manufacturing In this example, zirconium (Zr) nanoparticles are added to aluminum alloy Al 7075 as a grain refiner, and compared to pure Al 7075 with no Zr nanoparticle addition. The concentration of Zr in the functionalized alloy is about 1 vol %. The average Zr nanoparticle size is approximately 500-1500 nm. In both cases, the alloy or functionalized alloy is additively manufactured by selective laser melting as described above.

Figure 2A:
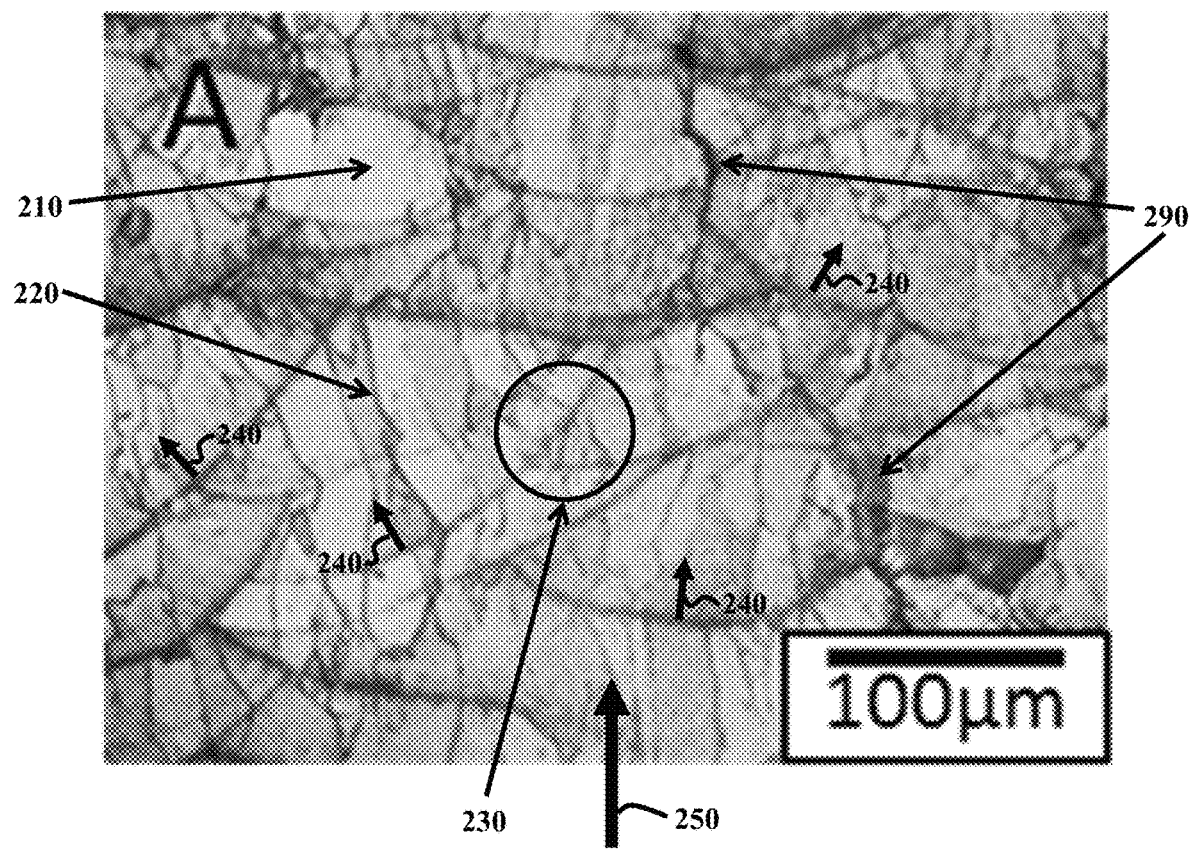
FIG. 2A shows an optical image of additively manufactured, non-grain-refined aluminum alloy Al 7075, revealing columnar grains and significant cracking.
Figure 2B:
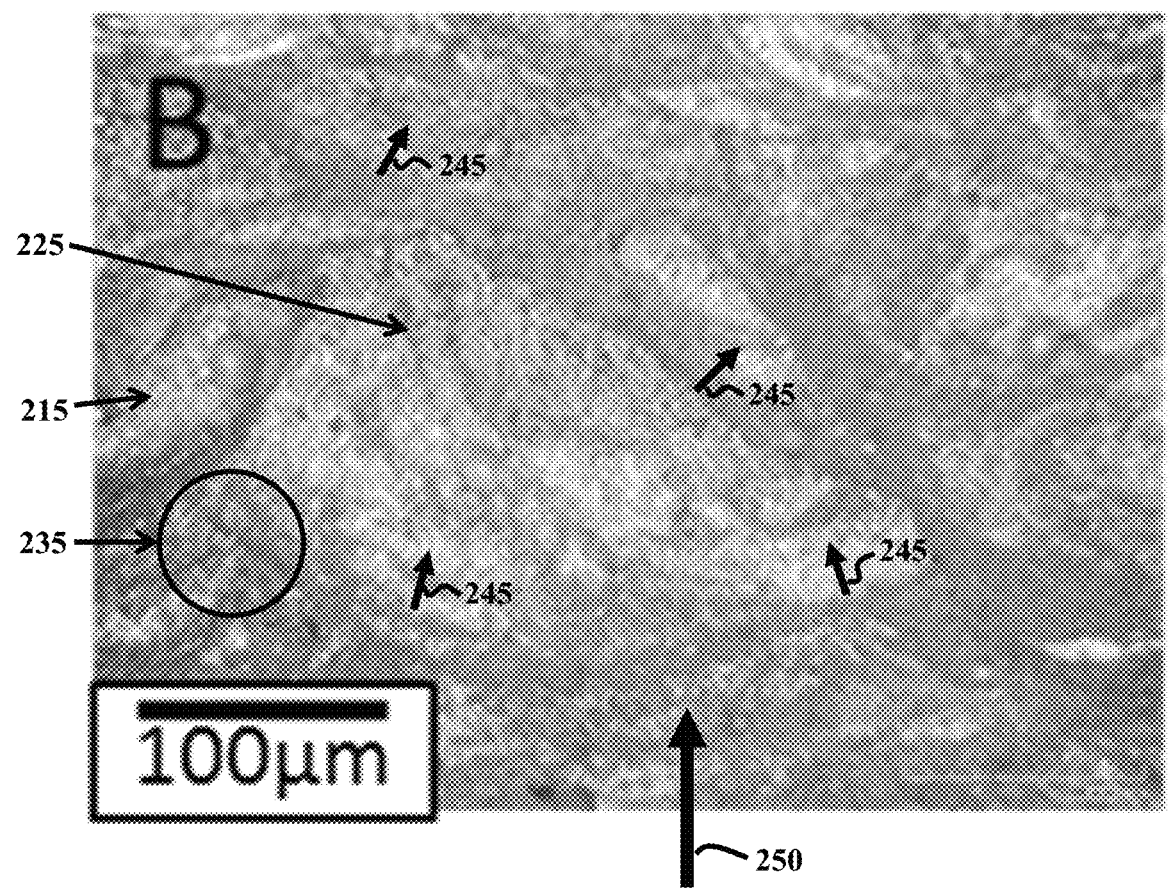
FIG. 2B shows an optical image of additively manufactured, grain-refined aluminum alloy Al 7075 with Zr particles, revealing fine equiaxed grains and a substantially crack-free microstructure, in Example 2 herein.

FIG. 2A shows an image of additively manufactured, non-grain-refined aluminum alloy 200 (Al 7075), revealing columnar grains 210 and significant cracking 290. FIG. 2B shows an image of additively manufactured, grain-refined aluminum alloy 205 (Al 7075 with Zr particles), revealing fine equiaxed grains 215 and a substantially crack-free microstructure. Without being limited by theory, it is believed that Zr forms a preferred nucleating phase at sufficient concentration to reduce the critical undercooling required for equiaxed nucleation.

It is also noted that both of FIGS. 2A and 2B (scale bars 100 µm) exhibit a characteristic structural pattern that indicates that the material was 3D-printed. The additive manufacturing process produces a unique microstructure with a weld-like pattern. There is a plurality of dendrites 230, 235 (from crystal growth) and grain boundaries 220, 225 within the microstructure. Also, the microstructures of FIGS. 2A and 2B have a crystallographic texture that is not solely oriented in the additive-manufacturing build direction 250. The dendrite 230, 235 layers have differing primary growth-direction angles 240, 245 with respect to each other.

Figure 3A:
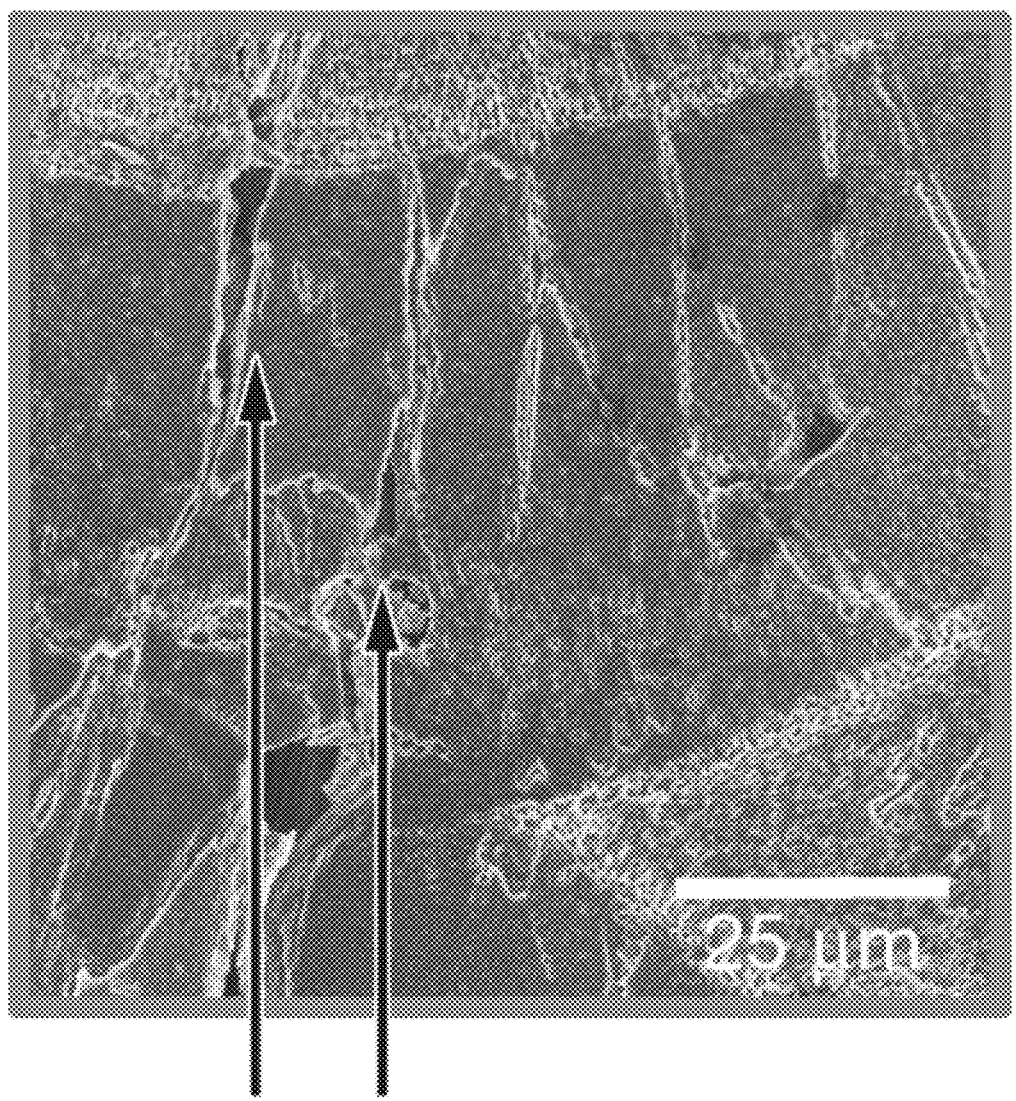
FIG. 3A shows a magnified (scale bar 25 µm), polished and etched SEM image of additively manufactured, non-grain-refined aluminum alloy Al 7075.
Figure 3B:
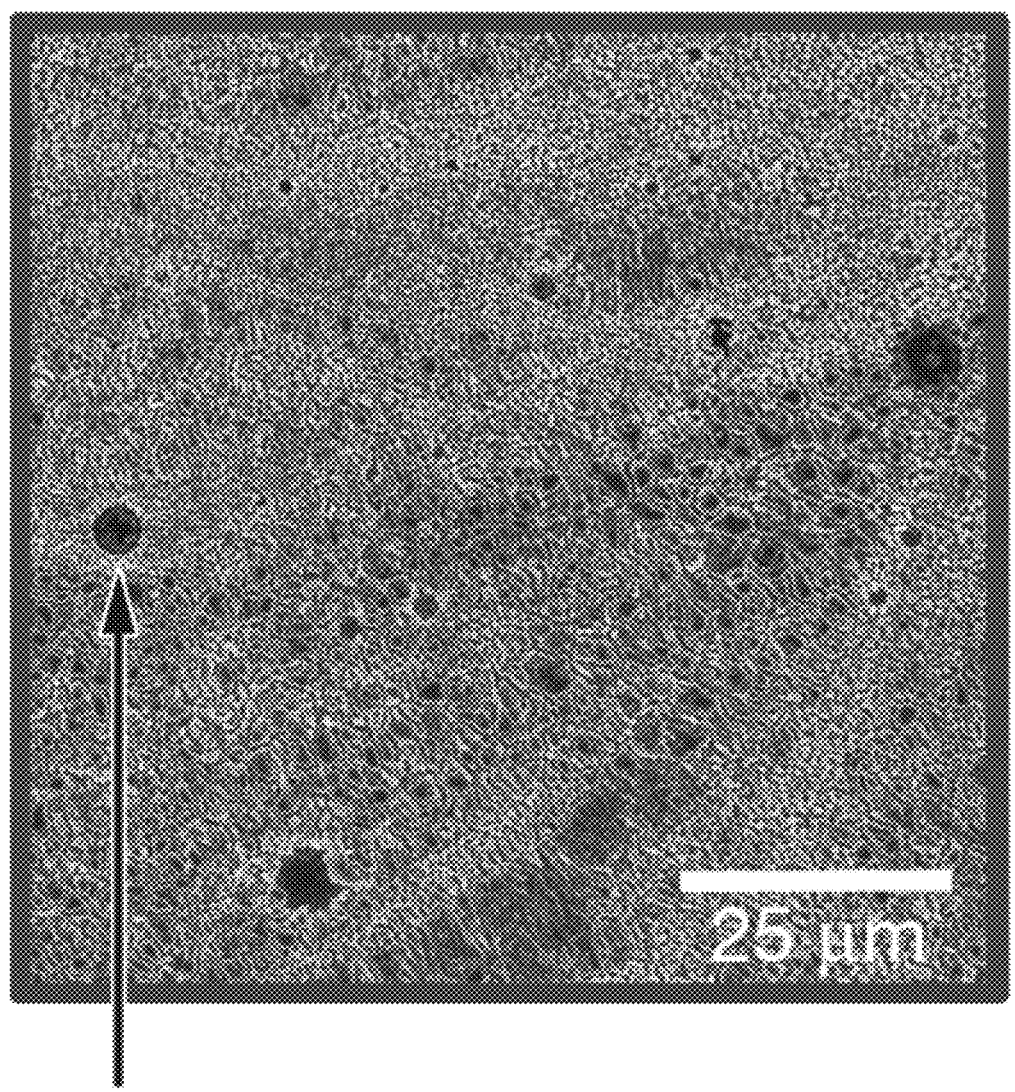
FIG. 3B shows a magnified (scale bar 25 µm), polished and etched SEM image of additively manufactured, grain-refined aluminum alloy, Al 7075+Zr, in Example 2 herein.

FIG. 3A shows a magnified (scale bar 25 µm), polished and etched SEM image of additively manufactured, non-grain-refined aluminum alloy Al 7075. FIG. 3B shows a magnified (scale bar 25 µm), polished and etched SEM image of additively manufactured, grain-refined aluminum alloy, Al 7075+Zr. The microstructure of the non-grain-refined aluminum alloy Al 7075 contains large cracks, as indicated for illustration. The microstructure of grain-refined Al 7075+Zr does not contain cracks, and contains some residual porosity.

Example 3: Additive Manufacturing of Aluminum Alloy Al 7075 with Zr Grain Refiner In this example, zirconium (Zr) nanoparticles are first added to aluminum alloy Al 7075. The concentration of Zr in the functionalized alloy is about 1 vol %. The average Zr nanoparticle size is approximately 500-1500 nm. The functionalized alloy is solution heat-treated and artificially aged (described above), indicated by "T6" in the alloy name (Al 7075+Zr-T6). A control aluminum alloy, Al 7075-T6, is compared to Al 7075+Zr-T6, as is AlSi10Mg, another common alloy for comparison.

The functionalized alloy (Al 7075+Zr-T6) is additively manufactured by selective laser melting as described above. The control alloys Al 7075-T6 and AlSi10Mg are 3D-printed with the same technique. It is believed that at least a portion of the Zr nanoparticles are in the form of $Al_3Zr$ nucleant particles following 3D printing.

Figure 4:
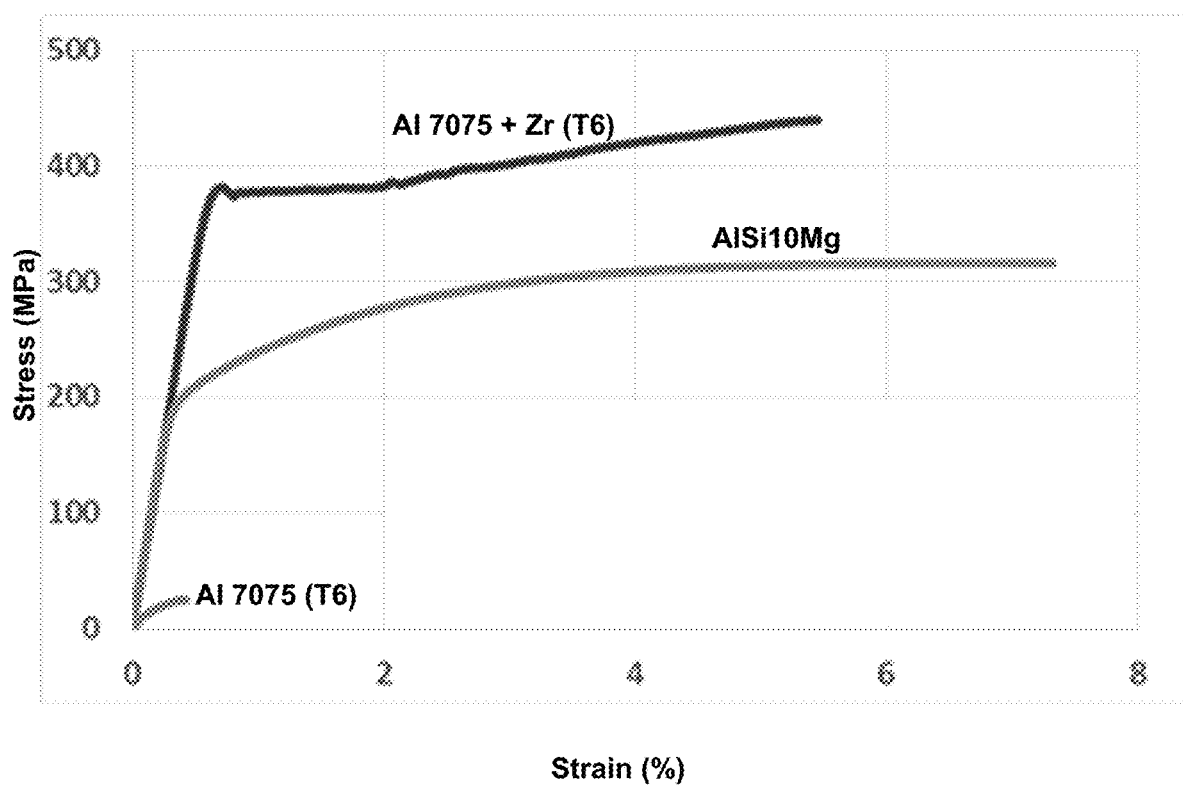
FIG. 4 is a stress-strain curve of a functionalized aluminum alloy versus two non-functionalized aluminum alloys, indicating significantly improved mechanical properties due to suppression of cracking in Al 7075+Zr-T6, in Example 3 herein.

FIG. 4 shows a stress-strain curve of the functionalized aluminum alloy versus the two non-functionalized aluminum alloys, indicating significantly improved mechanical properties due to suppression of cracking in Al 7075+Zr-T6. In particular, the Al 7075+Zr-T6 alloy exhibits a 500 microns, 400 microns of about 440 MPa. By contrast, the Al 7075-T6 control alloy exhibits a tensile strength of about 25 MPa. Even the common additively manufactured aluminum alloy, AlSi10Mg, exhibits a tensile strength (about 310 MPa) lower than that of the Al 7075+Zr-T6 of this example.

The addition of zirconium does not substantially alter the solidification behavior at high fractions of solid, where hot tearing is typically initiated. The early inclusion of zirconium induces equiaxed growth, which can more easily accommodate the thermal contraction strains associated with solidification. This ultimately results in an alloy system that is highly tear-resistant, despite conventional wisdom. Also, the Al 7075+Zr-T6 alloy demonstrates Lüders banding during deformation, which is indicative of an aluminum alloy with average grain sizes of less than 10 µm.

Inductively coupled plasma optical emission spectroscopy (ICP-OES) is completed on raw Al 7075+Zr powder and on an additively manufactured Al7075+Zr component. Analysis shows about 25% mass loss of zinc and about 32% mass loss of magnesium, both of which are strengthening elements for the Al 7075 alloy.

This example demonstrates that additive manufacturing of an aluminum alloy with a grain refiner increases the tensile strength significantly (almost 20× higher for Al 7075+Zr-T6 compared to Al 7075-T6). The process has been utilized to produce an additively manufactured aluminum alloy with a tensile strength over 400 MPa.

Example 4: Grain Refinement of Aluminum Alloy Al 6061 in Additive Manufacturing In this example, zirconium (Zr) nanoparticles are added to aluminum alloy Al 6061 as a grain refiner, and compared to pure Al 6061 with no Zr nanoparticle addition. The concentration of Zr in the functionalized alloy is about 1 vol %. The average Zr nanoparticle size is approximately 500-1500 nm. In both cases, the alloy or functionalized alloy is additively manufactured by selective laser melting as described above.

Figure 5A:
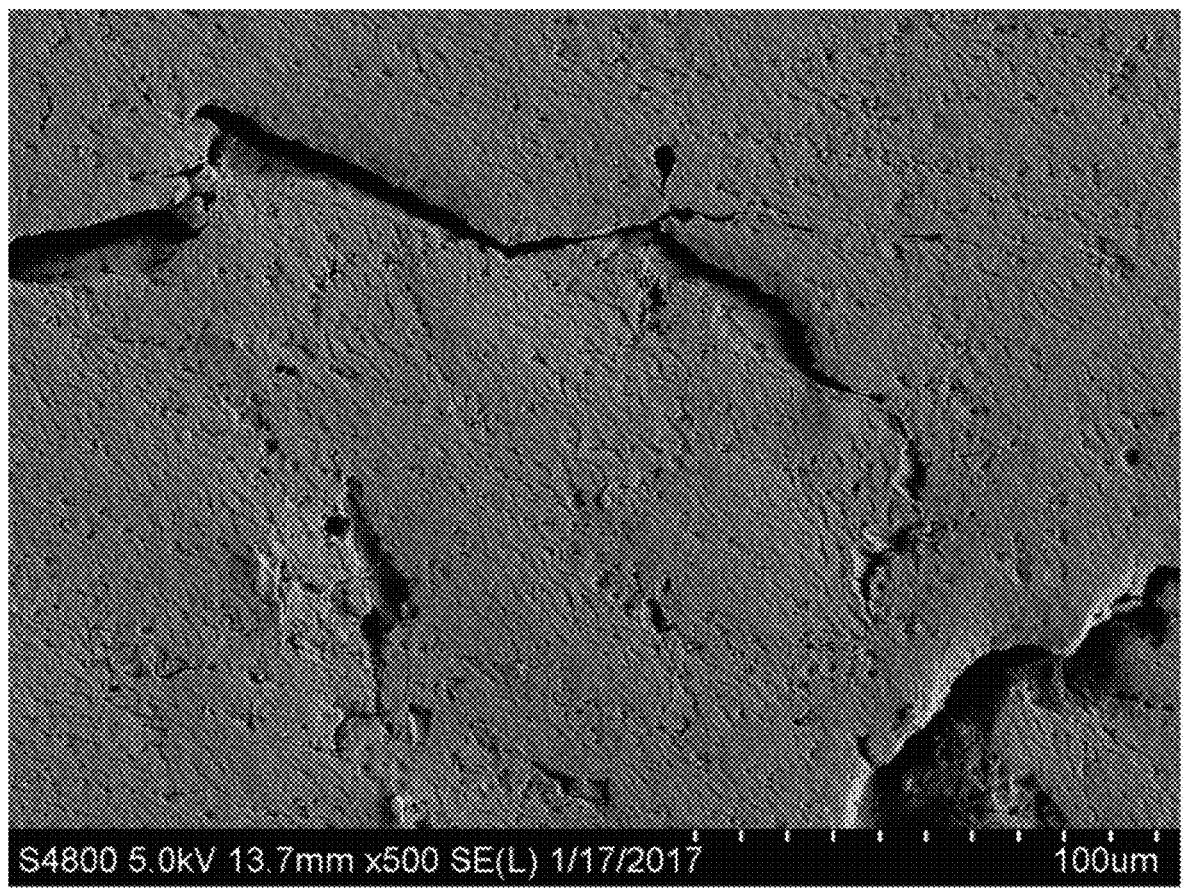
FIG. 5A shows an SEM image of additively manufactured, non-grain-refined aluminum alloy Al 6061, revealing significant cracking.
Figure 5B:
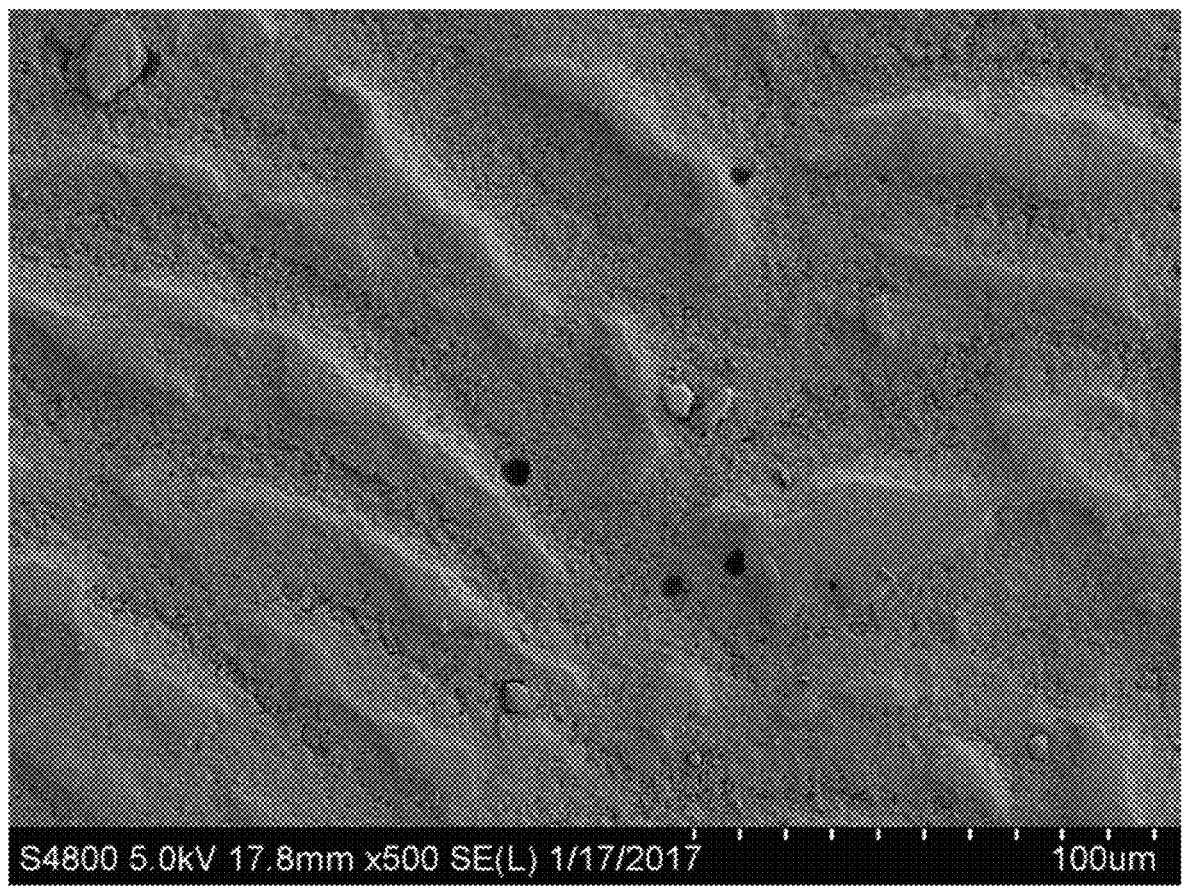
FIG. 5B shows an SEM image of additively manufactured, grain-refined aluminum alloy Al 6061 with Zr particles, revealing fine equiaxed grains and a substantially crack-free microstructure, in Example 4 herein.

FIG. 5A shows an image of additively manufactured, non-grain-refined aluminum alloy Al 6061, revealing significant cracking. FIG. 5B shows an image of additively manufactured, grain-refined aluminum alloy Al 6061 with Zr particles, revealing fine equiaxed grains and a substantially crack-free microstructure. These micrographs indicate essentially identical behavior compared to Al 7075 in Example 2. Without being limited by theory, it is believed that Zr forms a preferred nucleating phase (which may contain $Al_3Zr$) at sufficient concentration to reduce the critical undercooling required for equiaxed nucleation.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A process for additive manufacturing of a nanofunctionalized metal alloy, said process comprising:
   (a) selecting one or more metals;
   (b) selecting one or more grain-refining nanoparticles;
   (c) utilizing a lattice-matching algorithm and a crystallographic database to calculate lattice mismatch between said one or more grain-refining nanoparticles and said one or more metals;
   (d) providing a nanofunctionalized metal precursor containing said one or more metals and said grain-refining nanoparticles that are chemically and/or physically disposed on surfaces of said one or more metals, wherein said grain-refining nanoparticles are lattice-matched to within ±5%, as calculated in step (c), compared to a metal alloy containing said one or more metals but not said grain-refining nanoparticles;
   (e) exposing a first amount of said nanofunctionalized metal precursor to an energy source for melting said first amount of said nanofunctionalized metal precursor, thereby generating a first melt layer; and
   (f) solidifying said first melt layer, thereby generating an additively manufactured, nanofunctionalized metal alloy,
   wherein said additively manufactured, nanofunctionalized metal alloy has a microstructure with equiaxed grains, and
   wherein said additively manufactured, nanofunctionalized metal alloy has a microstructure that is substantially crack-free.

2. The process of claim 1, wherein said one or more metals are selected from the group consisting of aluminum, iron, nickel, copper, titanium, magnesium, zinc, silicon, lithium, silver, chromium, manganese, vanadium, bismuth, gallium, lead, and combinations thereof.

3. The process of claim 1, wherein grain-refining nanoparticles are selected from the group consisting of zirconium, tantalum, niobium, titanium, and oxides, nitrides, hydrides, carbides, or borides thereof, and combinations of the foregoing.

4. The process of claim 1, wherein said nanofunctionalized metal precursor is in the form of a powder.

5. The process of claim 1, wherein said nanofunctionalized metal precursor is in the form of a wire.

6. The process of claim 1, wherein said grain-refining nanoparticles are present in a nanoparticle concentration of at least 0.1 vol % within said nanofunctionalized metal precursor.

7. The process of claim 6, wherein said grain-refining nanoparticles are present in a nanoparticle concentration of at least 1 vol % within said nanofunctionalized metal precursor.

8. The process of claim 1, wherein said grain-refining nanoparticles have an average largest dimension from about 50 nanometers to about 5000 nanometers.

9. The process of claim 1, wherein said energy source is provided by a laser beam, an electron beam, or a combination thereof.

10. The process of claim 1, wherein steps (e) and (f) utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof.

11. The process of claim 1, wherein said additively manufactured, nanofunctionalized metal alloy is characterized by an average grain size of less than 1 millimeter.

12. The process of claim 11, wherein said additively manufactured, nanofunctionalized metal alloy is characterized by an average grain size of less than 10 microns.

13. The process of claim 1, wherein said additively manufactured, nanofunctionalized metal alloy is characterized by at least 90 vol % cast microstructure.

14. The process of claim 1, wherein at least 95 vol % of said additively manufactured, nanofunctionalized metal alloy contains no porous voids having an effective diameter of at least 1 micron.

15. The process of claim 1, said process further comprising repeating steps (e) and (f) a plurality of times to generate a plurality of solid layers by sequentially solidifying a plurality of melt layers in an additive-manufacturing build direction, and wherein said additively manufactured, nanofunctionalized metal alloy has a microstructure with a crystallographic texture that is not solely oriented in said additive-manufacturing build direction.

16. The process of claim 15, wherein said plurality of solid layers have differing primary growth-direction angles with respect to each other.

17. The process of claim 15, wherein said plurality of solid layers has an average layer thickness of at least 10 microns.

18. The process of claim 1, wherein said additively manufactured, nanofunctionalized metal alloy is selected from the group consisting of an aluminum alloy, a steel alloy, a nickel alloy, a titanium alloy, a copper alloy, and combinations thereof.

19. A process for additive manufacturing of a nanofunctionalized metal alloy, said process comprising:
   (a) selecting one or more metals;
   (b) selecting one or more grain-refining nanoparticles;
   (c) utilizing a lattice-matching algorithm and a crystallographic database to calculate lattice mismatch between said one or more grain-refining nanoparticles and said one or more metals;
   (d) providing a nanofunctionalized metal precursor containing said one or more metals and said grain-refining nanoparticles that are chemically and/or physically disposed on surfaces of said one or more metals, wherein said grain-refining nanoparticles are lattice-matched to within ±5%, as calculated in step (c), compared to a metal alloy containing said one or more metals but not said grain-refining nanoparticles;

(e) exposing a first amount of said nanofunctionalized metal precursor to an energy source for melting said first amount of said nanofunctionalized metal precursor, thereby generating a first melt layer;

(f) solidifying said first melt layer, thereby generating a nanofunctionalized metal alloy first solid layer; and (g) repeating steps (e) and (f) a plurality of times to generate a plurality of solid layers by sequentially solidifying a plurality of melt layers in an additive-manufacturing build direction, thereby generating an additively manufactured, nanofunctionalized metal alloy, wherein said plurality of solid layers has an average layer thickness of at least 10 microns, wherein said additively manufactured, nanofunctionalized metal alloy has a microstructure with equiaxed grains that are characterized by an average grain size of less than 10 microns, and wherein said additively manufactured, nanofunctionalized metal alloy has a microstructure that is substantially crack-free.

20. The process of claim 12, wherein said additively manufactured, nanofunctionalized metal alloy is characterized by an average grain size of about 2 microns or less.

21. The process of claim 19, wherein said equiaxed grains are characterized by an average grain size of about 2 microns or less.

22. The process of claim 1, wherein said grain-refining nanoparticles are lattice-matched to within ±0.5%, as calculated in step (c), compared to a metal alloy containing said one or more metals but not said grain-refining nanoparticles.

23. The process of claim 1, wherein said grain-refining nanoparticles are atomic density-matched to within ±25% compared to a metal alloy containing said one or more metals but not said grain-refining nanoparticles.

24. The process of claim 1, wherein said grain-refining nanoparticles are atomic density-matched to within ±5% compared to a metal alloy containing said one or more metals but not said grain-refining nanoparticles.

25. The process of claim 1, wherein said additively manufactured, nanofunctionalized metal alloy has a microstructure that is completely crack-free with no linear or tortuous cracks that are greater than 0.1 microns in width and greater than 10 microns in length.

26. The process of claim 19, wherein said one or more metals are selected from the group consisting of aluminum, iron, nickel, copper, titanium, magnesium, zinc, silicon, lithium, silver, chromium, manganese, vanadium, bismuth, gallium, lead, and combinations thereof.

27. The process of claim 19, wherein said grain-refining nanoparticles are selected from the group consisting of zirconium, tantalum, niobium, titanium, and oxides, nitrides, hydrides, carbides, or borides thereof, and combinations of the foregoing.

28. The process of claim 19, wherein said nanofunctionalized metal precursor is in the form of a powder.

29. The process of claim 19, wherein said nanofunctionalized metal precursor is in the form of a wire.

30. The process of claim 19, wherein said grain-refining nanoparticles are present in a nanoparticle concentration of at least 0.1 vol % within said nanofunctionalized metal precursor.

31. The process of claim 19, wherein said grain-refining nanoparticles are present in a nanoparticle concentration of at least 1 vol % within said nanofunctionalized metal precursor.

32. The process of claim 19, wherein said grain-refining nanoparticles have an average largest dimension from about 50 nanometers to about 5000 nanometers.

33. The process of claim 19, wherein said energy source is provided by a laser beam, an electron beam, or a combination thereof.

34. The process of claim 19, wherein steps (e) and (f) utilize a technique selected from the group consisting of selective laser melting, electron beam melting, laser engineered net shaping, selective laser sintering, direct metal laser sintering, integrated laser melting with machining, laser powder injection, laser consolidation, direct metal deposition, wire-directed energy deposition, plasma arc-based fabrication, ultrasonic consolidation, and combinations thereof.

35. The process of claim 19, wherein said additively manufactured, nanofunctionalized metal alloy has a microstructure with a crystallographic texture that is not solely oriented in said additive-manufacturing build direction.

36. The process of claim 19, wherein said plurality of solid layers have differing primary growth-direction angles with respect to each other.

37. The process of claim 19, wherein additively manufactured, nanofunctionalized metal alloy is characterized by at least 90 vol % cast microstructure.

38. The process of claim 19, wherein said equiaxed grains are characterized by an average grain size of about 2 microns or less.

39. The process of claim 19, wherein at least 95 vol % of said additively manufactured, nanofunctionalized metal alloy contains no porous voids having an effective diameter of at least 1 micron.

40. The process of claim 19, wherein said additively manufactured, nanofunctionalized metal alloy is selected from the group consisting of an aluminum alloy, a steel alloy, a nickel alloy, a titanium alloy, a copper alloy, and combinations thereof.

41. The process of claim 19, wherein said grain-refining nanoparticles are lattice-matched to within ±0.5%, as calculated in step (c), compared to a metal alloy containing said one or more metals but not said grain-refining nanoparticles.

42. The process of claim 19, wherein said grain-refining nanoparticles are atomic density-matched to within ±25% compared to a metal alloy containing said one or more metals but not said grain-refining nanoparticles.

43. The process of claim 42, wherein said grain-refining nanoparticles are atomic density-matched to within ±5% compared to a metal alloy containing said one or more metals but not said grain-refining nanoparticles.

44. The process of claim 19, wherein said additively manufactured, nanofunctionalized metal alloy has a microstructure that is completely crack-free with no linear or tortuous cracks that are greater than 0.1 microns in width and greater than 10 microns in length.

* * * * *